(12) United States Patent
Wang et al.

(10) Patent No.: US 11,640,678 B2
(45) Date of Patent: May 2, 2023

(54) METHOD FOR TRAINING OBJECT DETECTION MODEL AND TARGET OBJECT DETECTION METHOD

(71) Applicant: Tencent Technology (Shenzhen) Company Limited, Shenzhen (CN)

(72) Inventors: Xinggang Wang, Shenzhen (CN); Wenyu Liu, Shenzhen (CN); Chao Li, Shenzhen (CN); Junzhou Huang, Shenzhen (CN); Juhong Wang, Shenzhen (CN); Dongyuan Ma, Shenzhen (CN)

(73) Assignees: TENCENT TECHNOLOGY (SHENZHEN) COMPANY LIMITED, Shenzhen (CN); HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 302 days.

(21) Appl. No.: 17/194,186

(22) Filed: Mar. 5, 2021

(65) Prior Publication Data

US 2021/0192180 A1 Jun. 24, 2021

Related U.S. Application Data

(63) Continuation of application No. PCT/CN2019/122959, filed on Dec. 4, 2019.

(30) Foreign Application Priority Data

Dec. 5, 2018 (CN) .......................... 201811479732.8

(51) Int. Cl.
*G06K 9/00* (2022.01)
*G06T 7/77* (2017.01)
(Continued)

(52) U.S. Cl.
CPC ............ *G06T 7/77* (2017.01); *G06F 18/2148* (2023.01); *G06F 18/2193* (2023.01);
(Continued)

(58) Field of Classification Search
CPC . G06T 7/77; G06T 7/194; G06T 2207/10056; G06T 2207/20081;
(Continued)

(56) References Cited

U.S. PATENT DOCUMENTS

2006/0193520 A1 8/2006 Mita et al.
2007/0201747 A1 8/2007 Yamada et al.
(Continued)

FOREIGN PATENT DOCUMENTS

CN 102842131 A 12/2012
CN 103577795 A 2/2014
(Continued)

OTHER PUBLICATIONS

Tencent Technology, WO, PCT/CN2019/122959, dated Feb. 25, 2020, 6 pgs.
(Continued)

*Primary Examiner* — Jonathan S Lee
(74) *Attorney, Agent, or Firm* — Morgan, Lewis & Bockius LLP

(57) ABSTRACT

This application relates to a target object detection method and apparatus, a non-transitory computer-readable storage medium, and a computer device. The method includes: obtaining a to-be-detected image; inputting the to-be-detected image into a target object detection model; generating, by the target object detection model, a prediction diagram corresponding to the to-be-detected image, the prediction diagram describing a relation degree to which pixels of the to-be-detected image belong to a target detection object; and performing region segmentation on the
(Continued)

prediction diagram to obtain a target detection object region. In addition, a method and an apparatus for training an object detection model into the target object detection model, a non-transitory computer-readable storage medium, and a computer device are also provided.

20 Claims, 12 Drawing Sheets

(51) Int. Cl.
    *G06T 7/194*      (2017.01)
    *G06V 20/69*      (2022.01)
    *G06V 10/25*      (2022.01)
    *G06F 18/214*      (2023.01)
    *G06F 18/21*      (2023.01)
    *G06V 10/764*      (2022.01)
    *G06V 10/82*      (2022.01)

(52) U.S. Cl.
    CPC .............. *G06T 7/194* (2017.01); *G06V 10/25* (2022.01); *G06V 10/764* (2022.01); *G06V 10/82* (2022.01); *G06V 20/693* (2022.01); *G06V 20/698* (2022.01); *G06T 2207/10056* (2013.01); *G06T 2207/20081* (2013.01); *G06T 2207/30204* (2013.01); *G06V 2201/03* (2022.01); *G06V 2201/07* (2022.01)

(58) Field of Classification Search
    CPC .......... G06T 2207/30204; G06V 10/25; G06V 20/698; G06V 10/82; G06V 20/693; G06V 10/764; G06V 2201/03; G06V 2201/07; G06F 18/2148; G06F 18/2193
    USPC ......................................................... 382/103
    See application file for complete search history.

(56) References Cited

U.S. PATENT DOCUMENTS

| | | | |
|---|---|---|---|
| 2011/0085705 | A1 | 4/2011 | Izadi et al. |
| 2021/0097344 | A1* | 4/2021 | Goldstein ........ G06V 30/19173 |
| 2021/0097345 | A1* | 4/2021 | Goldstein ................ G06N 3/08 |

FOREIGN PATENT DOCUMENTS

| | | | |
|---|---|---|---|
| CN | 105324793 | A | 2/2016 |
| CN | 106447658 | A | 2/2017 |
| CN | 108764325 | A | 11/2018 |
| CN | 109697460 | A | 4/2019 |

OTHER PUBLICATIONS

Tencent Technology, IPRP, PCT/CN2019/122959, dated Jun. 8, 2021, 7 pgs.

Tencent Technology, ISR, PCT/CN2019/122959, dated Feb. 25, 2020, 2 pgs.

* cited by examiner

```
                                                    1302
┌─────────────────────────────────────────────────────────┐
│           Obtain a to-be-detected image                 │
└─────────────────────────────────────────────────────────┘
                            │
                            ▼                       1304
┌─────────────────────────────────────────────────────────┐
│ Input the to-be-detected image into a target object     │
│ detection model, the target object detection model      │
│ being obtained by performing parameter adjustment on    │
│ an initial object detection model according to a        │
│ training loss value, the training loss value being      │
│ obtained through calculation according to target pixels │
│ determined according to a first region and a second     │
│ region, the first region and the second region being    │
│ determined according to a position of a sample centroid │
│ of a target type object in a training sample image      │
└─────────────────────────────────────────────────────────┘
                            │
                            ▼                       1306
┌─────────────────────────────────────────────────────────┐
│ The target object detection model generates a           │
│ prediction diagram corresponding to the to-be-detected  │
│ image, the prediction diagram describing a relation     │
│ degree to which pixels of the to-be-detected image      │
│ belong to the target detection object                   │
└─────────────────────────────────────────────────────────┘
                            │
                            ▼                       1308
┌─────────────────────────────────────────────────────────┐
│ Perform region segmentation on a prediction diagram to  │
│ obtain a target detection object region                 │
└─────────────────────────────────────────────────────────┘
```

FIG. 13

| 0.7 | 0.5 | 0.3 |
|-----|-----|-----|
| 0.6 | 0.4 | 0.2 |
| 0.7 | 0.8 | 0.1 |
| 0.4 | 0.3 | 0.2 |

FIG. 14

| 1 | 1 | 0 |
|---|---|---|
| 1 | 0 | 0 |
| 1 | 1 | 0 |
| 0 | 0 | 0 |

FIG. 15

METHOD FOR TRAINING OBJECT DETECTION MODEL AND TARGET OBJECT DETECTION METHOD

CROSS REFERENCE TO RELATED APPLICATIONS

This application is a continuation application of PCT Patent Application No. PCT/CN2019/122959, entitled "OBJECT DETECTION MODEL TRAINING METHOD AND TARGET OBJECT DETECTION METHOD" filed on Dec. 4, 2019, which claims priority to Chinese Patent Application No. 201811479732.8, filed with the State Intellectual Property Office of the People's Republic of China on Dec. 5, 2018, and entitled "METHOD FOR TRAINING OBJECT DETECTION MODEL AND TARGET OBJECT DETECTION METHOD", all of which are incorporated herein by reference in their entirety.

FIELD OF THE TECHNOLOGY

This application relates to the field of computer technologies, and in particular, to a method and an apparatus for training an object detection model, a computer-readable storage medium, and a computer device, and a target object detection method and apparatus, a computer-readable storage medium, and a computer device.

BACKGROUND OF THE DISCLOSURE

In the related art, a marking person needs to accurately mark a training target object region in a training sample of an object detection model, so that the training sample can be used as a training sample of the object detection model. In this way, a finally trained target object detection model can achieve the effect. However, this method in which the training target object region needs to be accurately marked in the training sample needs high labor costs and also consumes a large amount of time. The result of marking is also easily affected by the marking person. Consequently, the prediction result of the finally trained target object detection model has low accuracy.

SUMMARY

Based on the above, a method and an apparatus for training an object detection model, a computer-readable storage medium, and a computer device are provided, where in the method, a training target region in a training sample image does not need to be accurately marked, to reduce labor costs, and a target object detection method and apparatus, a computer-readable storage medium, and a computer device are provided, where the method can improve the detection efficiency and accuracy of a target object, to resolve the foregoing problems.

A method for training an object detection model includes:
obtaining a training sample image set, training sample images in the training sample image set including a plurality of target-type objects with marked sample centroids;
determining a first region and a second region corresponding to each of the target-type objects according to a position of a sample centroid of the target-type object, the first region being a subregion of the second region, the first region and the second region having the same center, the center being the sample centroid of the corresponding target-type object;
calculating, by using an object detection model, a first relation degree to which pixels of the first region of the target-type object belong to a target region;
calculating, by using the object detection model, a second relation degree to which pixels beyond the second region of the target-type object belong to a background region;
calculating a training loss value according to the first relation degree and the second relation degree; and
adjusting the object detection model according to the training loss value, until a convergence condition is met, to obtain a target object detection model.

An apparatus for training an object detection model includes:
a training sample image set obtaining module, configured to obtain a training sample image set, training sample images in the training sample image set including a plurality of target-type objects with marked sample centroids;
a target region determining module, configured to determine a first region and a second region corresponding to each of the target-type objects according to a position of a sample centroid of the target-type object, the first region being a subregion of the second region, the first region and the second region having the same center, the center being the sample centroid of the corresponding target-type object;
an object detection model detection module, configured to calculate, by using an object detection model, a first relation degree to which pixels of the first region of the target-type object belong to a target region;
a relation degree calculation module, configured to calculate, by using the object detection model, a second relation degree to which pixels beyond the second region of the target-type object belong to a background region;
a training loss value calculation module, configured to calculate a training loss value according to the first relation degree and the second relation degree; and
a target object detection model generation module, configured to adjust the object detection model according to the training loss value, until a convergence condition is met, to obtain a target object detection model.

A computer device includes a memory, a processor, and a computer program stored in the memory and capable of being run on the processor, when executing the program, the processor implementing the following operations:
obtaining a training sample image set, training sample images in the training sample image set including a plurality of target-type objects with marked sample centroids;
determining a first region and a second region corresponding to each of the target-type objects according to a position of a sample centroid of the target-type object, the first region being a subregion of the second region, the first region and the second region having the same center, the center being the sample centroid of the corresponding target-type object;
calculating, by using an object detection model, a first relation degree to which pixels of the first region of the target-type object belong to a target region;
calculating, by using the object detection model, a second relation degree to which pixels beyond the second region of the target-type object belong to a background region;
calculating a training loss value according to the first relation degree and the second relation degree; and
adjusting the object detection model according to the training loss value, until a convergence condition is met, to obtain a target object detection model.

A non-transitory computer-readable storage medium stores a plurality of computer programs that, when executed by a processor of a computer device, cause the computer device to perform the aforementioned method for training an object detection model.

According to the foregoing object detection model training method and apparatus, the computer-readable storage medium, and the computer device, the first region and the second region corresponding to each target-type object are determined by simply and roughly marking only the sample centroid of the target-type object in the training sample image, the training sample image is inputted into the object detection model, which calculates the first probability that the pixels of the first region of the target-type object belong to the target region and the second probability that the pixels beyond the second region of the target-type object belong to the background region. The first region is the subregion of the second region. The training loss value is further calculated according to the first probability and the second probability. The model parameter of the object detection model is further adjusted according to the training loss value, until the convergence condition is met, to obtain the target object detection model. A simply and roughly marked training sample image can still be used for training the object detection model, so that the marking person does not need to spend a large amount of time and money in marking accurate date, thereby greatly reducing the working load of the marking person and the labor costs.

According to the foregoing target object detection method and apparatus, the computer-readable storage medium, and the computer device, the to-be-detected image is calculated through the trained target object detection model, to generate the prediction diagram corresponding to the to-be-detected image, the prediction diagram describing the probability that the pixels of the to-be-detected image belong to the target detection object, and finally region segmentation is performed according to the prediction diagram, to obtain the target detection object region. The trained target object detection model can not only automatically detect the probability that the pixels of the to-be-detected image belong to the target detection object, but also determine the target detection object region according to the probability that the pixels belong to the target detection object. Therefore, the trained target object detection model can reduce, to some extent, the working load of the target object detection person, improve the detection efficiency of the target object, improve the detection accuracy of the target object, and can further improve the detection costs of the target object.

BRIEF DESCRIPTION OF THE DRAWINGS

FIG. 13 is a schematic flowchart of a target object detection method according to an embodiment.

FIG. 14 is a schematic diagram of an interface of a prediction diagram generated by a target object detection model according to an embodiment.

FIG. 15 is a schematic diagram of an interface of a binarized prediction diagram according to an embodiment.

DESCRIPTION OF EMBODIMENTS

To make the objectives, technical solutions, and advantages of this application clearer and more understandable, this application is further described in detail below with reference to the accompanying drawings and embodiments. It is to be understood that the specific embodiments described herein are merely used for explaining this application but are not intended to limit this application.

Figure 1:
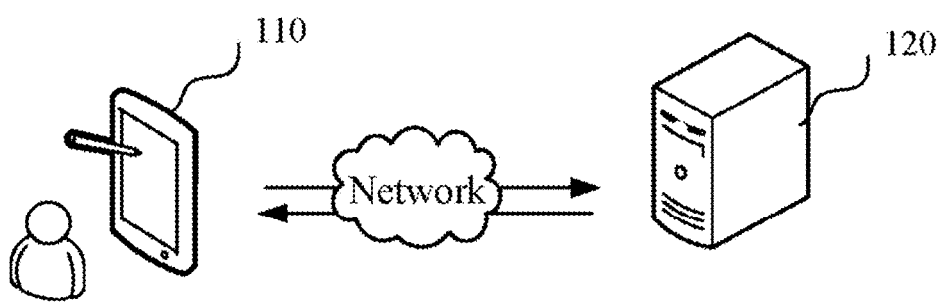
FIG. 1 is a diagram of an application environment of a method for training an object detection model according to an embodiment.

FIG. 1 is a diagram of an application environment of a method for training an object detection model according to an embodiment. Referring to FIG. 1, the method for training an object detection model is applied to a system for training an object detection model. The system for training an object detection model includes a terminal 110 and a server 120. The terminal 110 and the server 120 are connected by using a network. The terminal 110 may be a desktop terminal or a mobile terminal, and the mobile terminal may be a mobile phone, a tablet computer, a notebook computer, or another terminal. The server 120 may be implemented by an independent server or a server cluster that includes a plurality of servers.

The terminal 110 may send a training sample image set to the server 120, training sample images in the training sample image set including a plurality of target-type objects with marked sample centroids. The server 120 determines a first region and a second region corresponding to each target-type object according to a position of a sample centroid of the target-type object, and inputs the training sample images in the training sample image set into an object detection model. The first region is a subregion of the second region, and the first region and the second region have the same center, the center being the sample centroid of the corresponding target-type object. The object detection model calculates a first relation degree to which pixels of the first region of the target-type object belong to a target region; calculates a second relation degree to which pixels beyond the second region of the target-type object belong to a background region; calculates a training loss value according to the first relation degree and the second relation degree; and adjusts a model parameter of the object detection model according to the training loss value, until a convergence condition is met, to obtain a target object detection model. The server 120 may send the target object detection model to the terminal 110.

FIG. 1 may also be a diagram of an application environment of a target object detection method according to an embodiment. Referring to FIG. 1, the target object detection method is applied to a target object detection system. The target object detection system includes the terminal 110 and the server 120.

The terminal 110 may send a to-be-detected image to the server 120, the server 120 inputs the to-be-detected image into a target object detection model, the target object detection model being obtained by performing parameter adjustment on an initial object detection model according to a training loss value, the training loss value being obtained through calculation according to target pixels determined according to a first region and a second region, the first region and the second region being determined according to a position of a sample centroid of a target-type object in a training sample image. The target object detection model generates a prediction diagram corresponding to the to-be-detected image, and performs region segmentation on the prediction diagram to obtain a target detection object region. The server 120 finally sends the target detection object region to the terminal 110. The prediction diagram describes a relation degree to which pixels of the to-be-detected image belong to the target detection object.

Figure 2:
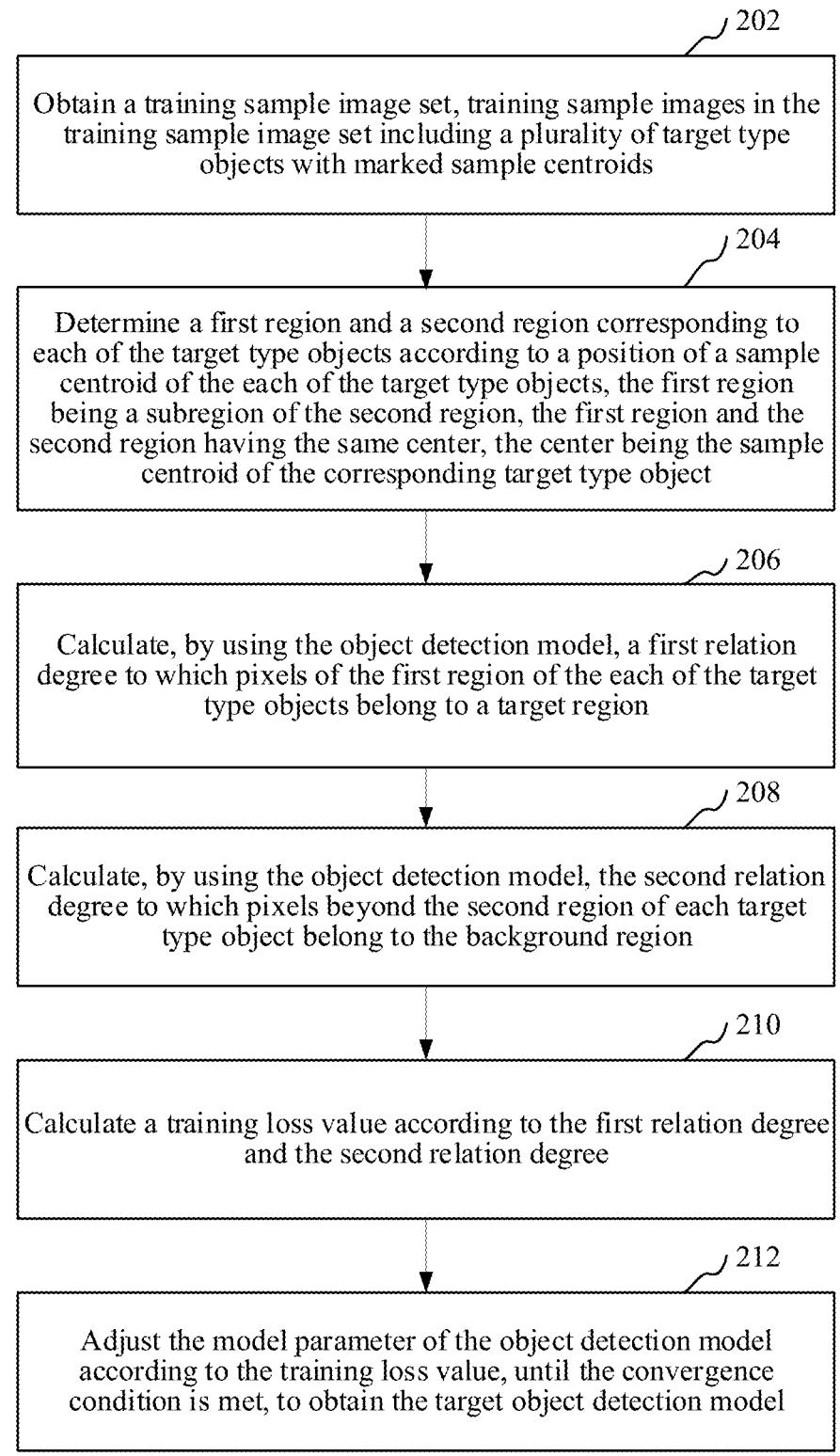
FIG. 2 is a schematic flowchart of a method for training an object detection model according to an embodiment.

As shown in FIG. 2, in an embodiment, a method for training an object detection model is provided. This embodiment is mainly described by using an example in which the method is applied to the terminal 110 or the server 120 in FIG. 1. Referring to FIG. 2, the method for training an object detection model may include the following steps:

Step 202: Obtain a training sample image set, training sample images in the training sample image set including a plurality of target-type objects with marked sample centroids.

The training sample image is a sample image used for training the object detection model, and includes different types of objects. A sample centroid of a target-type object may be marked by a marking person, who may mark a center pixel of the target-type object as a sample centroid, which may be used as reference for subsequently determining a first region and a second region. The training sample image includes different types of objects, may include the same type of target-type objects, or include target-type objects and non-target-type objects, or include the same type of non-target-type objects. The sample centroid of the non-target-type object does not need to be marked, and if the training sample image includes the non-target-type object, the detection accuracy of the target-type object can be improved. Because the non-target-type object in the training sample image belongs to the background region beyond the second region, the object detection model calculates a relation degree to which pixels of the non-target-type object belong to the background region.

An object that conforms to a preset rule may be selected from different types of objects in the training sample image according to the preset rule as the target-type object. The preset rule is self-defined, and may be determined according to different application scenarios. For example, in a medical scenario, the training sample image may be a cell section image, which includes non-dividing cells and dividing cells. Because dividing cells easily cause diseases in medicine, dividing cells in the cell section image are used as the target-type object.

In an embodiment, the training sample image is the cell section image. Because the cell section image includes non-dividing cells and dividing cells, both the non-dividing cells and the dividing cells are two different types of objects in the training sample image, and the target-type object may be the dividing cells. A marking person may mark a sample centroid of the dividing cells. Therefore, in this embodiment, the training sample image may be a cell section image including only dividing cells, or a cell section image including both non-dividing cells and dividing cells, or the like.

Step 204: Determine a first region and a second region corresponding to each of the target-type objects according to a position of a sample centroid of the target-type object, the first region being a subregion of the second region, the first region and the second region having the same center, the center being the sample centroid of the corresponding target-type object.

In an embodiment, a manner of constructing a region and the shape of an enclosed region are not limited. In a possible implementation, two concentric and non-overlapping closed regions using a position of a sample centroid as a center may be constructed as the first region and the second region. For example, two concentric circles with different radiuses using the position of the sample centroid as a circle center may be constructed as the first region and the second region. Alternatively, two concentric square regions with different side lengths using a position of a sample centroid as a center are constructed as the first region and the second region. The closed region may be a region of a regular shape, or a region of an irregular shape. Regardless of whether concentric circles or concentric other shapes are constructed, it needs to be ensured that the first region is the subregion of the second region, the first region and the second region can form a transition zone, and the first region and the second region have the same center, the center being the sample centroid of the corresponding target-type object. The transition zone herein is a non-overlapping region existing between the first region and the second region. The first region belongs to the target region, and if pixels fall into the first region, it indicates that the probability that the pixels belong to the target-type object is high. An area beyond the second area belongs to a background region, and if pixels fall into the area beyond the second area, it indicates that the probability that the pixels do not belong to the target-type object is high.

Step 206: Calculate, by using the object detection model, a first relation degree to which pixels of the first region of the target-type object belong to a target region.

The object detection model is a model used for calculating a relation degree to which pixels in the training sample image belong to a corresponding region. The object detection model may use a fully convolutional network (FCN) structure, a semantic segmentation network DeepLab structure, a convolutional neural network U-net structure, and the like. All training sample images in the training sample image set are inputted into the object detection model, which calculates a first relation degree to which pixels of the first region of each target-type object belong to the target region and a second relation degree to which pixels beyond the second region of the each target-type object belong to a background region. The first relation degree herein is a possibility that the pixels of the first region of the target-type object belong to the target region, and the first relation degree may be represented by a probability, a centesimal score, or a proportion. The target region is a region in which the target-type object is located.

Figure 3:
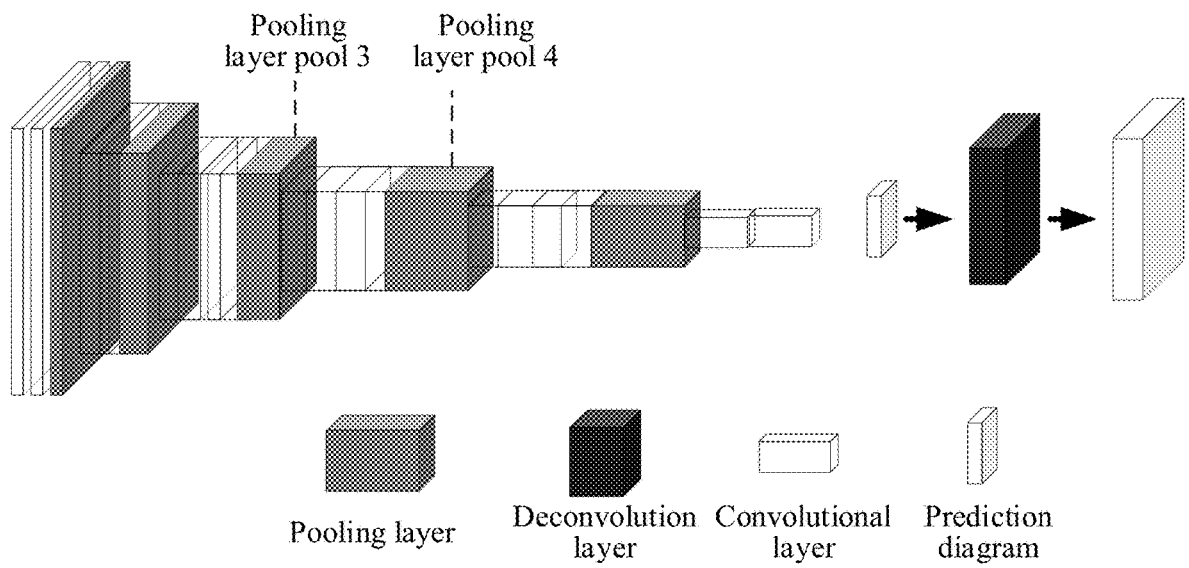
FIG. 3 is a schematic structural diagram of an object detection model according to an embodiment.

In an embodiment, the object detection model is the FCN structure. FIG. 3 shows a schematic structural diagram of an object detection model according to an embodiment. The FCN replaces a fully connected layer in a typical classification convolutional neural network CNN with a convolutional layer. Therefore, all operations (convolution, pooling, and the like) of the FCN network model do not damage a spatial structure of an image. As shown in FIG. 3, the object detection model includes but not limited to a convolutional layer, a pooling layer, a deconvolution layer, an output layer, and the like. In a possible implementation, after the training sample image in the training sample image set is inputted into the object detection model shown in FIG. 3, a diagram of a first probability that pixels of the first region of each target-type object belong to the target region is generated by a seventh layer of the convolutional layer (conv7 layer). Pooling operations have been performed for five times. In each pooling operation, the size of a feature map outputted by the convolutional layer is reduced by half. Therefore, the size of the finally obtained first probability diagram is 1/32 of that of the training sample image. Finally, a deconvolution layer operation of upsampling for 32 times is performed, to obtain the first probability diagram with the size consistent with that of the training sample image, and the diagram of the first probability that the pixels of the first region of each target-type object belong to the target region is used as an output result. The first probability diagram represents a first sub-probability that the pixels in the first region of the target-type object belong to the target region, and may be used as a first relation degree.

Step 208: Calculate, by using the object detection model, the second relation degree to which pixels beyond the second region of each target-type object belong to the background region.

Figure 4:
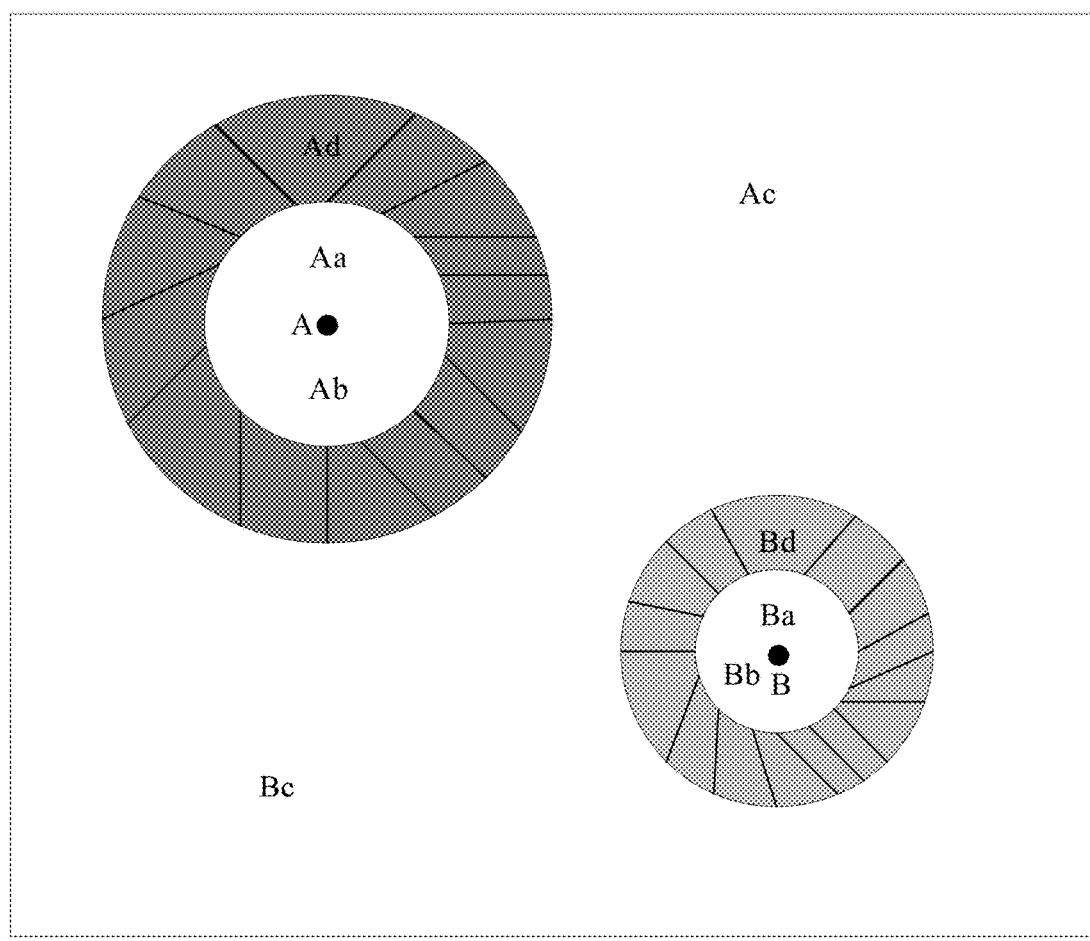
FIG. 4 is a schematic diagram of an interface according to an embodiment.

When calculating the first relation degree to which pixels of the first region of the target-type object belong to the target region, the object detection model also calculates the second relation degree to which pixels beyond the second region of the target-type object belong to the background region. If pixels fall into the background region, it indicates that the probability that the pixels do not belong to the target region is high, and the background region is all regions beyond the second region. The second relation degree herein may also be represented by a probability, a centesimal score, or a proportion. FIG. 4 shows a schematic diagram of an interface of a training sample image according to an embodiment. If the training sample image includes two sample centroids, namely, A and B, it is determined, according to a position of the sample centroid A, that the corresponding first region is Aa and the second region is Ab. The first region Aa is the subregion of the second region Ab, and the background region beyond the second region is Ac. A non-overlapping region between the first region Aa and the second region Ab is Ad, a small circle corresponding to the sample centroid A is the first region Aa, a big circle corresponding to the sample centroid A is the second region Ab, and a shadow region is a non-overlapping region Ad. It is determined, according to a position of the sample centroid B, that the corresponding first region is Ba and the second region is Bb. The first region Ba is the subregion of the second region Bb, and the background region beyond the second region is Bc. A non-overlapping region between the first region Ba and the second region Bb is Bd, a small circle corresponding to the sample centroid B is the first region Ba, a big circle corresponding to the sample centroid B is the second region Bb, and a shadow region is a non-overlapping region Bd. To ensure the detection accuracy of the finally trained object detection model, when the object detection model calculates the first relation degree or the second relation degree, the non-overlapping regions Ad and Bd corresponding to the sample centroids A and B are not incorporated into a calculation range, that is, a non-overlapping region corresponding to each sample centroid is not incorporated into the calculation range.

Figure 5:
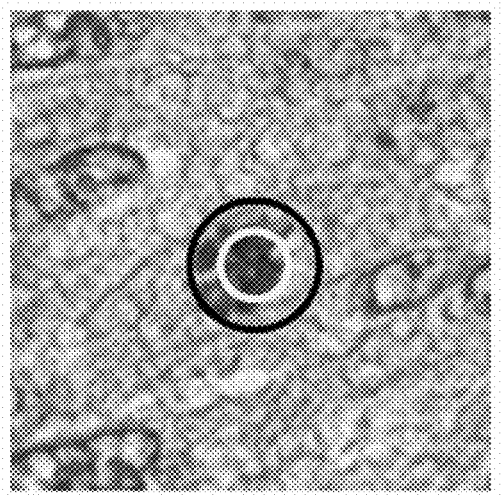
FIG. 5 is a schematic diagram of an interface of a first region and a second region of a cell section image according to an embodiment.

In an embodiment, the training sample image is a cell section image. FIG. 5 shows a schematic diagram of an interface of a first region and a second region of a cell section image. In FIG. 5, two circles are formed using a centroid of a cell as a circle center and using two different radiuses. The small circle in FIG. 5 is the first region, the big circle in FIG. 5 is the second region, and the first region is the subregion of the second region.

In an embodiment, as shown in FIG. 3, after the training sample image in the training sample image set is inputted into the object detection model shown in FIG. 3, a diagram of a second probability that pixels beyond the second region of each target-type object belong to the background region is generated by a seventh layer of the convolutional layer (conv7 layer). Pooling operations have been performed for five times. In each pooling operation, the size of a feature map outputted by the convolutional layer is reduced by half. Therefore, the size of the finally obtained second probability diagram is 1/32 of that of the training sample image. Finally, a deconvolution layer operation of upsampling for 32 times is performed, to obtain the second probability diagram with the size consistent with that of the training sample image, and the diagram of the second probability that the pixels beyond the second region of each target-type object belong to the background region is used as an output result. The second probability diagram represents a second sub-probability that the pixels beyond the second region of the target-type object belong to the background region, and may be used as a second relation degree.

Step 210: Calculate a training loss value according to the first relation degree and the second relation degree.

After calculating the first relation degree to which the pixels of the first region of the target-type object belong to the target region and the second relation degree to which the pixels beyond the second region of the target-type object belong to the background region, the object detection model may calculate the training loss value according to the first relation degree and the second relation degree through a preset calculation manner. The preset calculation manner may be self-defined. The self-defined preset calculation manner may alternatively be: first separately taking logs of the first relation degree to which the pixels of the first region of the target-type object belong to the target region and the second relation degree to which the pixels beyond the second region of the target-type object belong to the background region, and then performing summation on the first relation degree and the second relation degree whose logs are taken, and then adding a minus sign before the sum, and finally adding a regularization term for calculation to obtain the training loss value. The regularization term may be self-defined, and may be obtained through calculation according to a preset weighting factor, or the like. Alternatively, the self-defined preset calculation manner may be: performing weighted summation on the first relation degree to which the pixels of the first region of the target-type object belong to the target region and the second relation degree to which the pixels beyond the second region of the target-type object belong to the background region, to obtain the training loss value.

Step 212: Adjust the model parameter of the object detection model according to the training loss value, until the convergence condition is met, to obtain the target object detection model.

After the training loss value is obtained through calculation, the model parameter of the object detection model is adjusted according to the training loss value, until the convergence condition is met, to obtain the target object detection model. The convergence condition may be self-defined, that is, when the training loss value reaches minimum, it may be considered that the object detection model meets the convergence condition, to obtain the target object detection model. A higher detection accuracy of the target object detection model indicates a higher relation degree to which the pixels in the training sample image belong to the correct region, and a smaller corresponding training loss value. Therefore, after the training loss value is obtained through calculation according to the first relation degree and the second relation degree, the model parameter of the object detection model is adjusted to enable the training loss value to meet the convergence condition. In a possible implementation, a model parameter of each layer of the object detection model may be optimized through a back propagation (BP) algorithm, and a final model parameter is obtained through iteration for a plurality of times by using a stochastic gradient descent (SGD) method, to further obtain the target object detection model.

According to the foregoing object detection model training method, the first region and the second region corresponding to each target-type object are determined by simply and roughly marking only the sample centroid of the target-type object in the training sample image, the training sample image is inputted into the object detection model, which calculates the first probability that the pixels of the first region of the target-type object belong to the target region and the second probability that the pixels beyond the second region of the target-type object belong to the background region. The first region is the subregion of the second region. The training loss value is further calculated according to the first probability and the second probability. The model parameter of the object detection model is further adjusted according to the training loss value, until the convergence condition is met, to obtain the target object detection model. A simply and roughly marked training sample image can still be used for training the object detection model, so that the marking person does not need to spend a large amount of time and money in marking accurate date, thereby greatly reducing the working load of the marking person and the labor costs.

Figure 6:
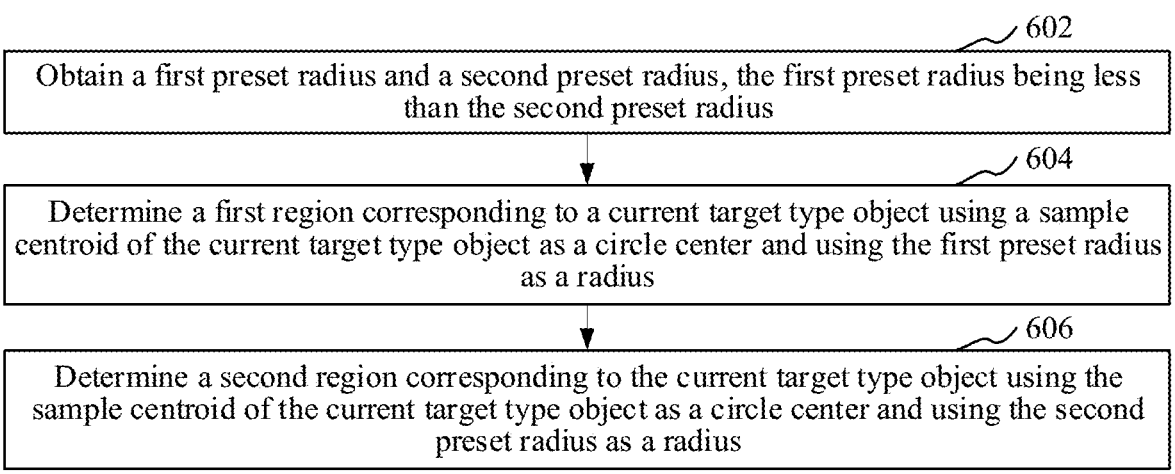
FIG. 6 is a schematic flowchart of determining a first region and a second region corresponding to each target-type object according to a position of a sample centroid of the target-type object.

In an embodiment, as shown in FIG. 6, determining a first region and a second region corresponding to each target-type object according to a position of a sample centroid of each target-type object includes:

Step 602: Obtain a first preset radius and a second preset radius, the first preset radius being less than the second preset radius.

The preset radius is used for determining ranges corresponding to the first region and the second region. The preset radius may be predetermined according to an object in the training sample image, or predetermined through experimental data, or determined in other manners. This is not limited in this embodiment of this application. Before the first region and the second region corresponding to each target-type object are determined, the first preset radius and the second preset radius need to be obtained. To ensure that the first region is a subregion of the second region, the first preset radius needs to be less than the second preset radius. The first preset radius and the second preset radius may be set according to actual requirements. For example, the first preset radius is a random value in a range of 10 pixels to 17 pixels, and the second preset radius is a random value in a range of 1.5 times to 2.5 times of the first preset radius.

Step 604: Determine a first region corresponding to a current target-type object using a sample centroid of the current target-type object as a circle center and using the first preset radius as a radius.

Step 606: Determine a second region corresponding to the current target-type object using the sample centroid of the current target-type object as a circle center and using the second preset radius as a radius.

Figure 7:
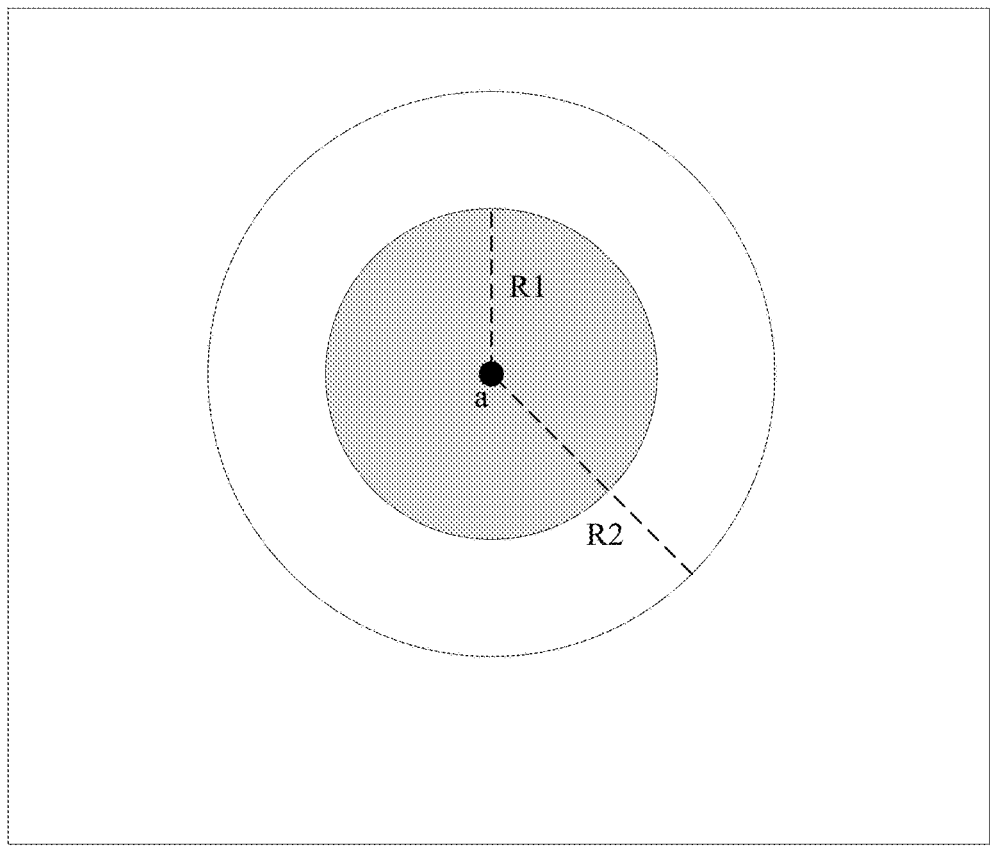
FIG. 7 is a schematic diagram of an interface of determining a first region and a second region corresponding to each target-type object according to a position of a sample centroid of the target-type object.

In an embodiment, using the current target-type object as an example, after the first preset radius and the second preset radius are obtained, the first region corresponding to the current target-type object is constructed using a sample centroid of the current target-type object as a circle center and using the first preset radius as a radius. Then, the second region corresponding to the current target-type object is constructed using the sample centroid of the current target-type object as a circle center and using the second preset radius as a radius. In an embodiment, FIG. 7 shows a schematic diagram of an interface of determining a first region and a second region corresponding to each target-type object according to a position of a sample centroid of the target-type object. FIG. 7 shows a training sample image in which the current target-type object is located. A sample centroid of the current target-type object is a. A circle is drawn using the sample centroid a as a circle center and using the first preset radius R1 as a radius, to obtain the first region corresponding to the current target-type object. Similarly, a circle is drawn using the sample centroid a as a circle center and using the second preset radius R2 as a radius, to obtain the second region corresponding to the current target-type object.

Figure 8:
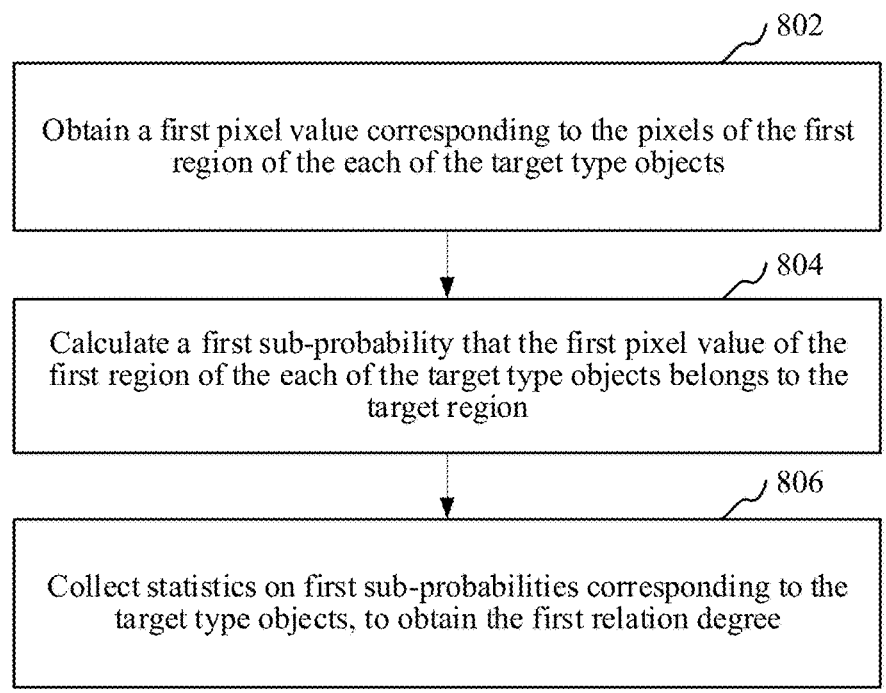
FIG. 8 is a schematic flowchart of calculating, by an object detection model, a first relation degree to which pixels of a first region of each target-type object belong to a target region according to an embodiment.

In an embodiment, as shown in FIG. 8, calculating, through an object detection model, a first relation degree to which pixels of a first region of each target-type object belong to a target region includes:

Step 802: Obtain a first pixel value corresponding to the pixels of the first region of the target-type object.

Step 804: Calculate a first sub-probability that the first pixel value of the first region of the target-type object belongs to the target region.

Because each pixel of the training sample image has a corresponding pixel value, first pixel values corresponding to all pixels of the first region of each target-type object may be obtained, and the first sub-probability that the first pixel value of the first region of each target-type object belongs to the target region may be calculated according to a preset calculation function. The preset calculation function may be self-defined. The self-defined preset calculation function may be a softmax function. The first pixel values corresponding to all pixels in the first region of each target-type object are converted into the corresponding first sub-probabilities that the pixels belong to the target region by using the softmax function. The first sub-probability may be a relative probability. In addition, in this embodiment of this application, the first sub-probability that the first pixel value of the first region of the target-type object belongs to the target region may alternatively be calculated according to the model parameter of the object detection model.

Step 806: Collect statistics on first sub-probabilities corresponding to the target-type objects, to obtain the first relation degree.

In an embodiment, after the first sub-probability that the first pixel value of the first region of the target-type object belongs to the target region is calculated, statistics are collected on the first sub-probabilities corresponding to the target-type objects, to obtain the first relation degree. A statistical manner of the first relation degree may be self-defined, and the self-defined statistical manner may be: performing summation on first sub-probabilities corresponding to the target-type objects to obtain a first relation degree, or the self-defined statistical manner may be: performing weighted summation on the first sub-probabilities corresponding to the target-type objects to obtain the first relation degree, or the self-defined statistical manner may be: calculating an average value or a variance of the first sub-probabilities corresponding to the target-type objects to obtain the first relation degree, or the like.

Figure 9:
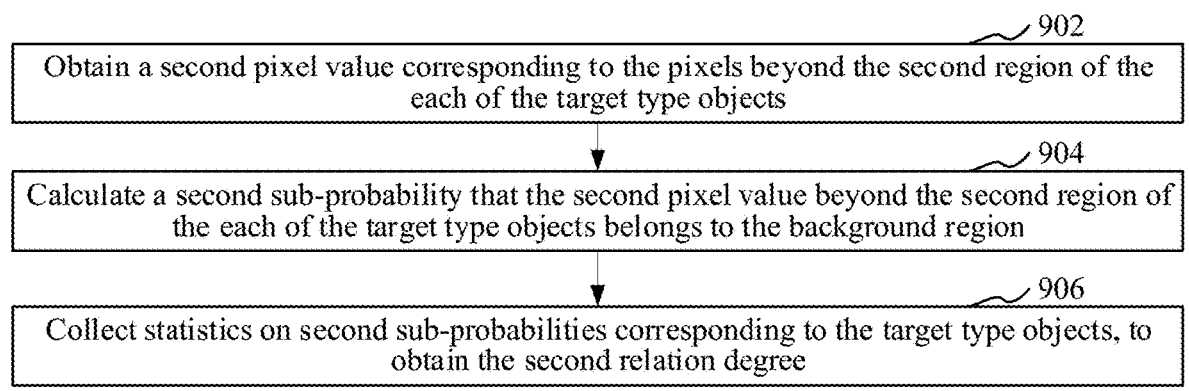
FIG. 9 is a schematic flowchart of calculating, by an object detection model, a second relation degree to which pixels beyond a second region of each target-type object belong to a background region according to an embodiment.

In an embodiment, as shown in FIG. 9, calculating, through an object detection model, a second relation degree to which pixels beyond a second region of each target-type object belong to a background region includes:

Step 902: Obtain a second pixel value corresponding to the pixels beyond the second region of the target-type object.

Step 904: Calculate a second sub-probability that the second pixel value beyond the second region of the target-type object belongs to the background region.

Because each pixel of the training sample image has a corresponding pixel value, second pixel values corresponding to all pixels beyond the second region of each target-type object may be obtained, and the second sub-probability that the second pixel value beyond the second region of each target-type object belongs to the background region may be calculated according to a preset calculation function. The preset calculation function may be self-defined. The self-defined preset calculation function may be a softmax function. The second pixel values corresponding to all pixels beyond the second region of each target-type object are converted into the corresponding second sub-probabilities that the pixels belong to the background region by using the softmax function. Similarly, the second sub-probability may also be a relative probability. In addition, in this embodiment of this application, the second sub-probability that the second pixel value beyond the second region of the target-type object belongs to the background region may alternatively be calculated according to the model parameter of the object detection model.

Step 906: Collect statistics on second sub-probabilities corresponding to the target-type objects, to obtain the second relation degree.

In an embodiment, after the second sub-probability that the second pixel value beyond the second region of the target-type object belongs to the background region is calculated, statistics are collected on the second sub-probabilities corresponding to the target-type objects, to obtain the second relation degree. A statistical manner of the second relation degree may be self-defined, and the self-defined statistical manner may be: performing summation on second sub-probabilities corresponding to the target-type objects to obtain a second relation degree, or the self-defined statistical manner may be: performing weighted summation on the second sub-probabilities corresponding to the target-type objects to obtain the second relation degree, or the self-defined statistical manner may be: calculating an average value or a variance of the second sub-probabilities corresponding to the target-type objects to obtain the second relation degree, or the like.

In an embodiment, calculating the training loss value according to the first relation degree and the second relation degree includes: calculating according to the first sub-probabilities and the second sub-probabilities to obtain the training loss value, the first relation degree being obtained according to the first sub-probabilities corresponding to the target-type objects, the second relation degree being obtained according to the second sub-probabilities corresponding to the target-type objects. The first sub-probability is a sub-probability that the pixels of the first region of the target-type object belong to the target region and that is calculated according to the model parameter of the object detection model, and the second sub-probability is a sub-probability that pixels beyond the second region of the target-type object belong to the background region and that is calculated according to the model parameter of the object detection model.

In an embodiment, calculation is performed according to the first relation degree and the second relation degree to obtain a training loss value, where a calculation formula is as follows:

$$L = -\sum_{n=1}^{N}\left(\sum_{x \in C1} \log P(1|x; W) + \sum_{x \in B} \log P(0|x; W)\right) + \lambda \sum_{n=1}^{N} \|W\|_2^2$$

where X is any pixel value; W is the model parameter of the object detection model; N is a quantity of the training sample images; C1 is the first region; P(1|x;W) is the first sub-probability that the pixel value X belongs to the target region, and represents a probability that the pixel value X belongs to the target region in a case that the model parameter is W; B is the background region beyond the second region; P(1|x;W) is the second sub-probability that the pixel value X belongs to the background region, and represents a probability that the pixel value X belongs to the background region in a case that the model parameter is W; L is the training loss value, a last term of the training loss value L is a regularization term, and the regularization term is used for constraining the model parameter W; and λ is a weight factor.

In an embodiment, because first regions and second regions corresponding to the target-type objects exist in the training sample image, when the training loss value is calculated, first pixel values corresponding to pixels of the first regions of the target-type objects are first obtained, first sub-probabilities P(1|x;W) that all first pixel values of the first regions of the target-type objects belong to the target region in a case that the model parameter of the object detection model is W are calculated, and second pixel values corresponding to all pixels beyond the second regions of the target-type objects are also obtained, and second sub-probabilities P(0|x;W) that all the second pixel values beyond the second regions of the target-type objects belong to the background region in a case that the model parameter is W are calculated. 1 represents the target region, and 0 represents the background region.

In addition, after the first sub-probabilities P(1|x;W) corresponding to all first pixel values of the first region of the target-type objects are calculated, statistics may be collected on the first sub-probabilities corresponding to the target-type objects, to obtain the first relation degree. In a possible implementation, collecting statistics on first sub-probabilities corresponding to the target-type objects, to obtain the first relation degree may include: first taking logs of all the first sub-probabilities, and then performing summation to obtain the first relation degree, that is, the first relation degree corresponding to the target-type objects is $$\sum_{x \in C1} \log P(1|x; W).$$

Similarly, after second sub-probabilities P(0|x;W) corresponding to all second pixel values beyond the second region of the target-type objects are calculated, statistics may be collected on the second sub-probabilities corresponding to pixel values beyond the second region of the target-type objects, to obtain the second relation degree. In a possible implementation, collecting statistics on second sub-probabilities corresponding to pixel values beyond the second regions of the target-type objects, to obtain the second relation degree may include: first taking logs of all the second sub-probabilities, and then performing summation to obtain the second relation degree, that is, the second relation degree corresponding to the pixels beyond the second regions of the target-type objects is $$\sum_{x \in B} \log P(0|x; W).$$

Finally, after the first relation degree and the second relation degree are calculated, the training loss value L may be calculated according to the first relation degree and the second relation degree. In a possible implementation, calculating the training loss value L according to the first relation degree and the second relation degree may include: performing summation on the first relation degree and the second relation degree, adding a minus sign, and then obtaining a regularization term to obtain the training loss value L. The regularization term is used for constraining the model parameter W, and may be calculated according to the weight factor X and the object detection model W, such as $$\lambda \sum_{n=1}^{N} \|W\|_2^2.$$

In an embodiment, the training sample images include cell section images, the target-type object is dividing cells, and obtaining a training sample image set includes: obtaining a plurality of stained cell section images, the plurality of stained cell section images forming the training sample image set, where the plurality of stained cell section images include different types of cells, and cells in the cell section images include at least one of dividing cells and non-dividing cells.

The training sample images include cell section images. A target-type object in the cell section image is dividing cells. The dividing cells are cells generated in a process of allocating, by a eukaryotic cell, chromosomes in a cell nucleus of the eukaryotic cell to two daughter nucleuses. Cytokinesis usually follows the karyokinesis. Cell structures such as cytoplasms, organelles, and cell membranes are all equally allocated to daughter cells. The dividing cells are cells generated in the splitting processes. Therefore, in a scenario of treatment detection of some diseases, the invasion of a disease, such as the breast cancer, is learned by detecting the quantity of dividing cells, and the histological grading assessment of the breast cancer relates to three morphological features: the formation of glandular tubes, nuclear pleomorphism, and the mitotic count. The dividing cell count is the quantity of dividing cells in a high-power field of view. This indicator indicates the invasion of breast cancer tumors. It can be learned that the quantity of dividing cells is of great significance to the diagnosis and grading of cancer.

Figure 10:
FIG. 10 is a schematic diagram of a step of obtaining a stained cell section image according to an embodiment.
Figure 11:
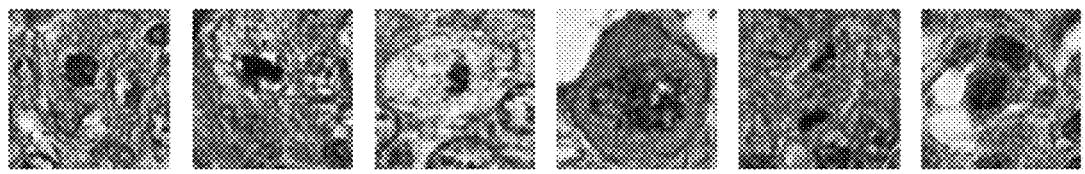
FIG. 11 is a schematic diagram of an interface of a cell section image including dividing cells according to an embodiment.
Figure 12:
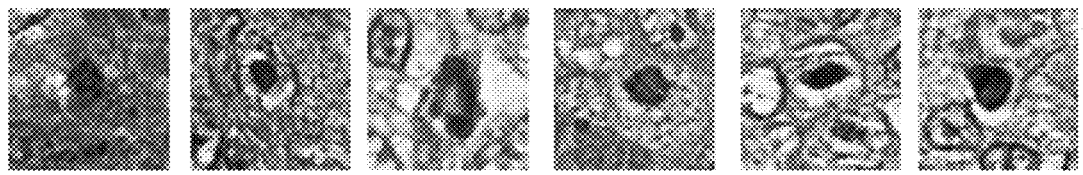
FIG. 12 is a schematic diagram of an interface of a cell section image including only non-dividing cells according to an embodiment.

In an embodiment, FIG. 10 shows a schematic diagram of a step of obtaining a stained cell section image according to an embodiment. A relevant person makes a cell section, and slices the section into sheets by using a microscope slicing machine, and then places the sections on a slide for H&E staining. The stained sections are scanned by a scanning electron microscope, to generate stained cell section images. A plurality of stained cell section images include different types of cells, and different types of cells include dividing cells and non-dividing cells. Cells in the cell section image include at least one of dividing cells and non-dividing cells. That is, the cells in the cell section image may include only dividing cells or only non-dividing cells, or include both dividing cells and non-dividing cells. The cell section image including dividing cells may be shown in FIG. 11. FIG. 11 is a schematic diagram of an interface of a cell section image including dividing cells according to an embodiment. The cell section image including only non-dividing cells may be shown in FIG. 12. FIG. 12 is a schematic diagram of an interface of a cell section image including only non-dividing cells according to an embodiment.

As shown in FIG. 13, in an embodiment, a target object detection method is provided. This embodiment is mainly described by using an example in which the method is applied to the terminal 219 or the server 220 in FIG. 1. Referring to FIG. 13, the target object detection method may include the following steps:

Step 1302: Obtain a to-be-detected image.

The to-be-detected image includes but is not limited to a picture, a photo, a video, or the like. The to-be-detected image may be a photo photographed by a camera, a screenshot, an image uploaded by using an application capable of uploading the image, or the like. The to-be-detected image includes a target detection object. In an embodiment, in an application scenario of disease diagnosis and treatment, the to-be-detected image may be a cell section image, and the target detection object in the cell section image is dividing cells.

Step 1304: Input the to-be-detected image into a target object detection model, the target object detection model being obtained by performing parameter adjustment on an initial object detection model according to a training loss value, the training loss value being obtained through calculation according to target pixels determined according to a first region and a second region, the first region and the second region being determined according to a position of a sample centroid of a target-type object in a training sample image.

The target object detection model is a target object detection model trained through the method for training the object detection model shown in FIG. 2. The method for training the object detection model shown in FIG. 2 has described the training process of the object detection model. Details are not described herein again. Target training pixels are pixels of the first region of each target-type object and pixels beyond the second region of the each target-type object.

Step 1306: The target object detection model generates a prediction diagram corresponding to the to-be-detected image, the prediction diagram describing a relation degree to which pixels of the to-be-detected image belong to the target detection object.

In an embodiment, after the to-be-detected image is inputted into the target object detection model, the target object detection model generates a prediction diagram corresponding to the to-be-detected image, the prediction diagram describing a relation degree to which pixels of the to-be-detected image belong to the target detection object. The relation degree herein may be represented by a probability, a centesimal score, or a percentage. For example, the prediction diagram describes a probability that pixels in the to-be-detected image belong to the first region and a probability that the pixels in the to-be-detected image belong to the second region.

Step 1308: Perform region segmentation on a prediction diagram to obtain a target detection object region.

In an embodiment, the prediction diagram outputted by the target object detection model describes a relation degree to which the pixels in the to-be-detected image belong to the target detection object, and region segmentation may be performed according to the relation degree corresponding to the pixels that is described in the prediction diagram, to obtain the target detection object region. In a possible implementation, performing region segmentation according to the relation degree corresponding to the pixels that is described in the prediction diagram, to obtain a target detection object region may include: first smoothing the prediction diagram, and removing some sharp noise points. Then, a binarized threshold is selected for binarization, to obtain a segmented binarized prediction diagram, and region segmentation is performed according to the binarized prediction diagram, to obtain the target detection object region. FIG. 14 is a schematic diagram of an interface of a prediction diagram generated by a target object detection model according to an embodiment. FIG. 14 shows a prediction diagram after smoothing. FIG. 14 shows a relation degree that the pixels belong to the target detection object. Then, a binarized threshold is selected for binarization, to obtain a segmented binarized prediction diagram, as shown in FIG. 15. Finally, region segmentation is performed according to the binarized prediction diagram shown in FIG. 15, to obtain the target detection object region, such as the dashed line box in FIG. 15. One dashed line box in FIG. 15 represents one target detection object region.

According to the foregoing target object detection method and apparatus, the computer-readable storage medium, and the computer device, the to-be-detected image is calculated through the trained target object detection model, to generate the prediction diagram corresponding to the to-be-detected image, the prediction diagram describing the probability that the pixels of the to-be-detected image belong to the target detection object, and finally region segmentation is performed according to the prediction diagram, to obtain the target detection object region. The trained target object detection model can not only automatically detect the probability that the pixels of the to-be-detected image belong to the target detection object, but also determine the target detection object region according to the probability that the pixels belong to the target detection object. Therefore, the trained target object detection model can reduce, to some extent, the working load of the target object detection person, improve the detection efficiency of the target object, improve the detection accuracy of the target object, and can further improve the detection costs of the target object.

Figure 16:
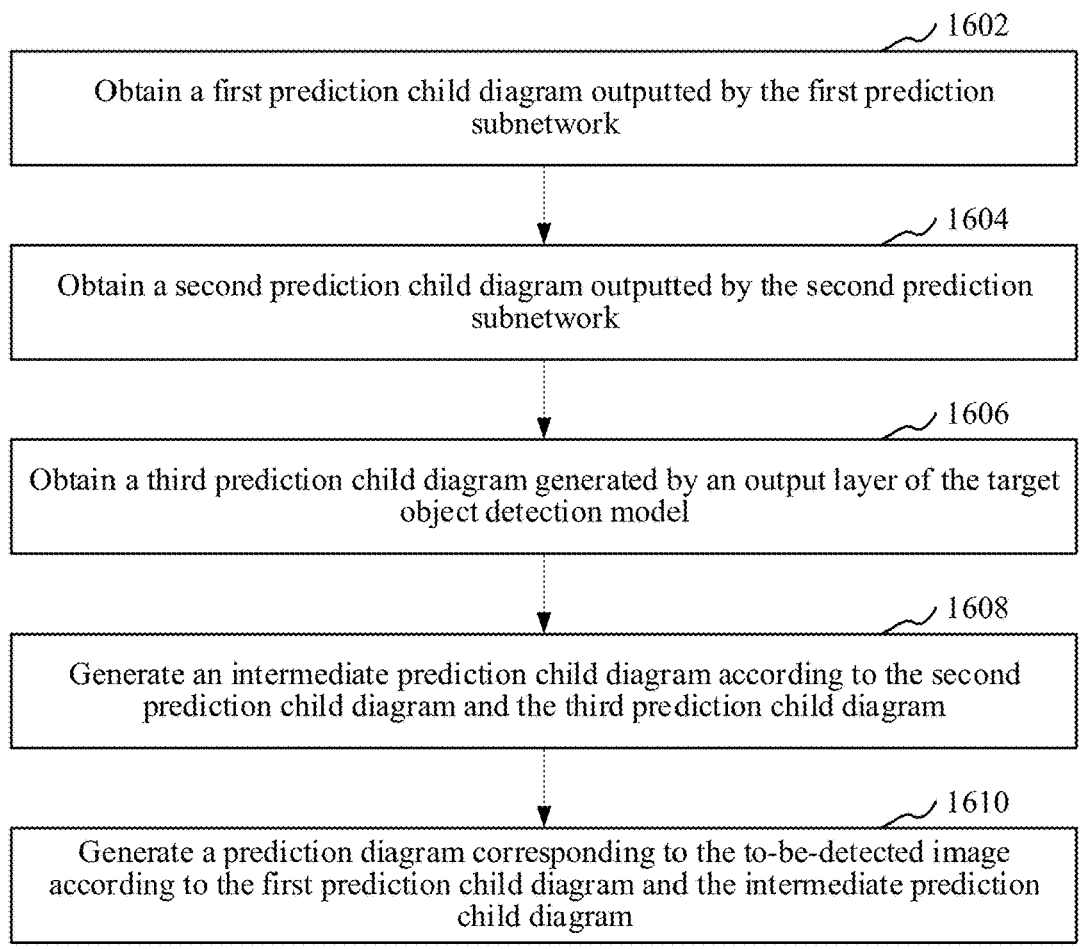
FIG. 16 is a schematic flowchart of generating, by a target object detection model, a prediction diagram corresponding to a to-be-detected image according to an embodiment.

In an embodiment, as shown in FIG. 16, the target object detection model includes a first prediction subnetwork and a second prediction subnetwork, the second prediction subnetwork being a backward pooling layer of the first prediction subnetwork, and generating a prediction diagram corresponding to the to-be-detected image by the target object detection model includes:

Step 1602: Obtain a first prediction child diagram outputted by the first prediction subnetwork.

Step 1604: Obtain a second prediction child diagram outputted by the second prediction subnetwork.

The target object detection model includes the first prediction subnetwork and the second prediction subnetwork. The second prediction subnetwork is a backward pooling layer of the first prediction subnetwork. A network structure of the target object detection model may be a network structure shown in FIG. 3. The target object detection model shown in FIG. 3 includes but not limited to a convolutional layer, a pooling layer, a deconvolution layer, an output layer, and the like. The first prediction subnetwork may be a third layer of the pooling layer pool 3 shown in FIG. 3, and the second prediction subnetwork may be a fourth layer of the pooling layer pool 4 shown in FIG. 3. Specifically, obtaining the first prediction child diagram outputted by the first prediction subnetwork and obtaining the second prediction child diagram outputted by the second prediction subnetwork is obtaining the first prediction child diagram shown in pool 3 and the second prediction child diagram shown in pool 4 in FIG. 3. Because in each pooling operation, the size of the feature map outputted by the convolutional layer is reduced by half, the first prediction child diagram and the second prediction child diagram respectively generated by the pool 3 and the pool 4 are reduced by respectively 8 times and 16 times compared with the to-be-detected image.

Step 1606: Obtain a third prediction child diagram generated by an output layer of the target object detection model.

Step 1608: Generate an intermediate prediction child diagram according to the second prediction child diagram and the third prediction child diagram.

Figure 17:
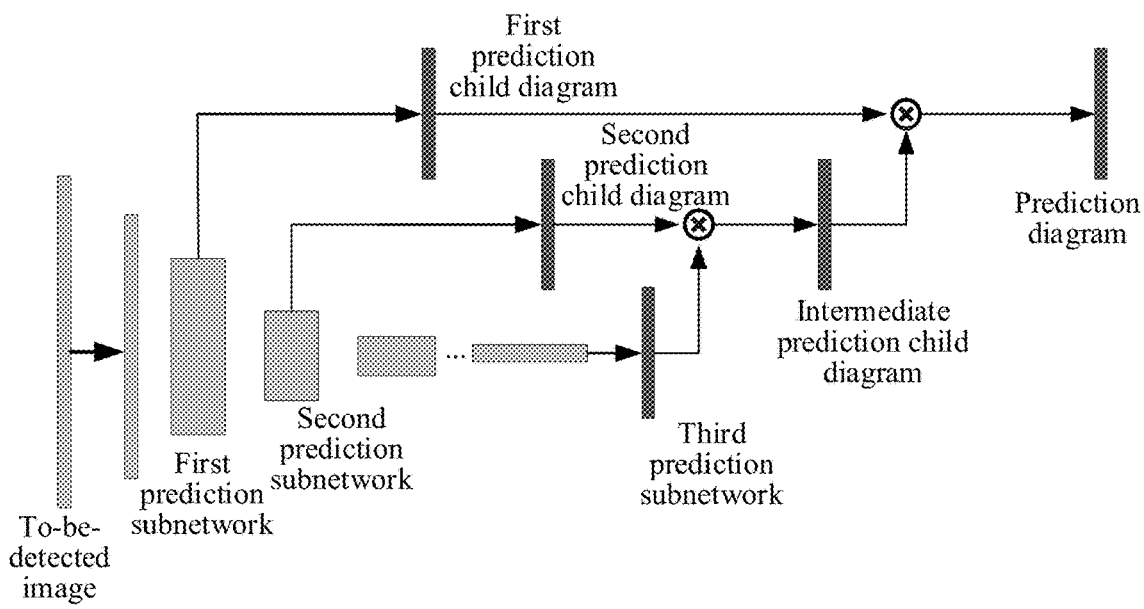
FIG. 17 is a schematic structural diagram of a prediction diagram that is generated by a target object detection model and that corresponds to a to-be-detected image according to an embodiment.

Because the target object detection model includes a convolutional layer, a pooling layer, a deconvolution layer, an output layer, and the like, the third prediction child diagram outputted by the output layer of the target object detection model may be obtained. FIG. 17 shows a schematic structural diagram of a prediction diagram that is generated by a target object detection model and that corresponds to a to-be-detected image according to an embodiment. After the first prediction child diagram outputted by the first prediction subnetwork, the second prediction child diagram outputted by the second prediction subnetwork, and the third prediction child diagram generated by the output layer of the target object detection model, to improve the accuracy of the prediction diagram generated by the target object detection model, an intermediate prediction child diagram can be generated according to the second prediction child diagram and the third prediction child diagram. In a possible implementation, generating the intermediate prediction child diagram according to the second prediction child diagram and the third prediction child diagram may include: superposing the second prediction child diagram with the third prediction child diagram to generate the intermediate prediction child diagram, and the superposition may be performing summation on the second prediction child diagram and the third prediction child diagram.

Step 1610: Generate a prediction diagram corresponding to the to-be-detected image according to the first prediction child diagram and the intermediate prediction child diagram.

In an embodiment, as shown in FIG. 17, after the intermediate prediction child diagram is generated according to the second prediction child diagram and the third prediction child diagram, the prediction diagram corresponding to the to-be-detected image is generated according to the first prediction child diagram and the intermediate prediction child diagram, to improve the accuracy of the generated prediction diagram. Generating the prediction diagram corresponding to the to-be-detected image according to the first prediction child diagram and the intermediate prediction child diagram may include: superposing the first prediction child diagram with the intermediate prediction child diagram to generate the corresponding prediction child diagram, and the superposition includes but not limited to performing summation on the first prediction child diagram and the intermediate prediction child diagram.

Figure 18:
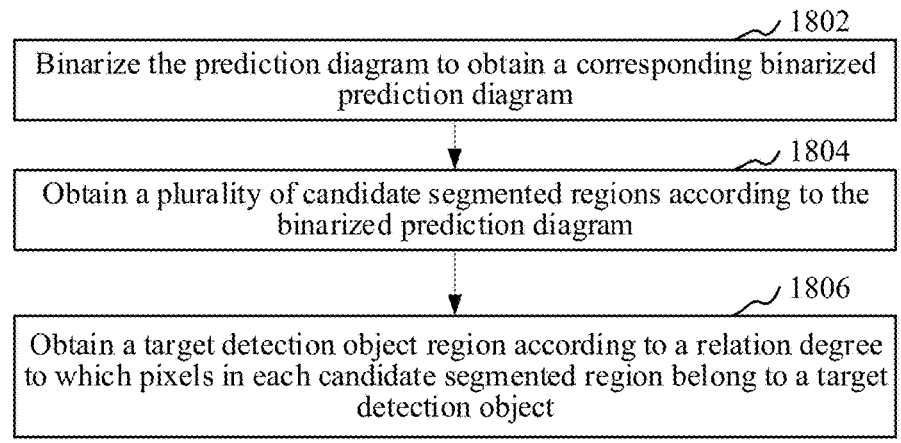
FIG. 18 is a schematic flowchart of performing region segmentation on a prediction diagram to obtain a target detection object region according to an embodiment.

In an embodiment, as shown in FIG. 18, performing region segmentation on a prediction diagram to obtain a target detection object region includes:

Step 1802: Binarize the prediction diagram to obtain a corresponding binarized prediction diagram.

Step 1804: Obtain a plurality of candidate segmented regions according to the binarized prediction diagram.

Step 1806: Obtain a target detection object region according to a relation degree to which pixels in each candidate segmented region belong to a target detection object.

Binarization means setting a grayscale value of a pixel on the prediction diagram to 0 or 255, that is, the entire prediction diagram presents only obvious black and white visual effects. For example, after the target object detection model generates the prediction diagram corresponding to the to-be-detected image, to ensure the segmentation accuracy of the final target detection object region, the prediction diagram needs to be binarized, to obtain a corresponding binarized prediction diagram. Further, a plurality of candidate segmented regions are obtained according to the binarized prediction diagram, and binarized pixels with the same grayscale value may be grouped into a candidate segmented region. FIG. 14 shows a prediction diagram after smoothing. FIG. 14 shows a relation degree that the pixels belong to the target detection object. Then, a binarized threshold is selected for binarization, to obtain a segmented binarized prediction diagram, as shown in FIG. 15. Then, region segmentation is performed according to the binarized prediction diagram shown in FIG. 15, to obtain the candidate segmented region, such as the dashed line box in FIG. 15. One dashed line box in FIG. 15 represents one candidate segmented region.

In addition, obtaining the target detection object region according to the relation degree to which the pixels in the candidate segmented regions belong to the target detection object to obtain the target detection object region may include: obtaining a relation degree corresponding to the pixels in the candidate segmented regions according to the prediction diagram, and filtering according to the relation degree corresponding to the pixels in the candidate segmented regions, to obtain the target detection object region. For example, probabilities corresponding to the pixels in the candidate segmented regions are obtained according to the prediction diagram, an average value of the pixels in the candidate segmented regions is calculated to obtain the average value of the pixels corresponding to the candidate segmented regions, and filtering is performed according to the average value of the pixels corresponding to the candidate segmented regions to obtain the target detection object region. Filtering according to the average value of the pixels corresponding to the candidate segmented regions to obtain the target detection object region may include: filtering out candidate segmented regions whose pixel average values are less than a preset average value, to obtain the target detection object region.

Figure 19:
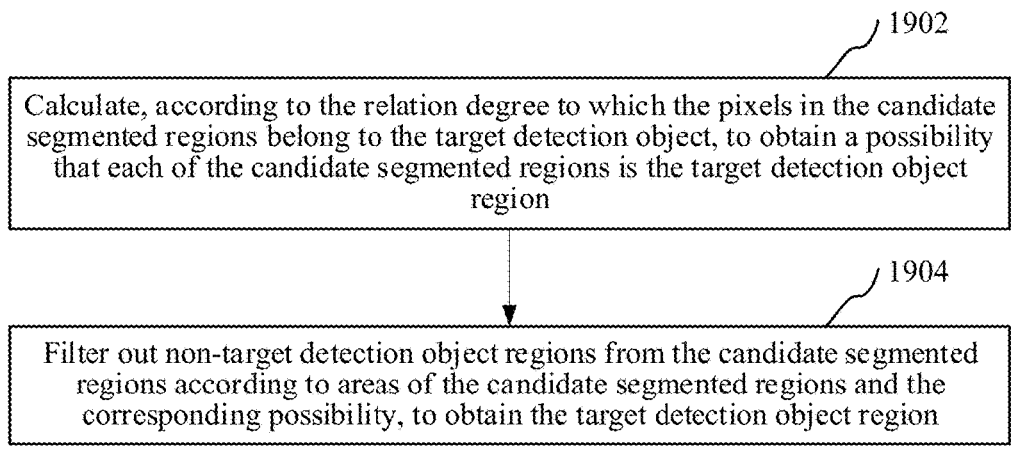
FIG. 19 is a schematic flowchart of obtaining a target detection object region according to a relation degree to which pixels in each candidate segmented region belong to a target detection object according to an embodiment.

In an embodiment, as shown in FIG. 19, obtaining a target detection object region according to a relation degree to which pixels in each candidate segmented region belong to a target detection object includes:

Step 1902: Calculate, according to the relation degree to which the pixels in the candidate segmented regions belong to the target detection object, a possibility that each of the candidate segmented regions is the target detection object region.

Step 1904: Filter out non-target detection object regions from the candidate segmented regions according to areas of the candidate segmented regions and the corresponding possibility, to obtain the target detection object region.

In an embodiment, after the plurality of candidate segmented regions are obtained according to the binarized prediction diagram, the possibility that each of the candidate segmented regions is the target detection object region is obtained through calculation according to the probability that the pixels in the candidate segmented regions belong to the target detection object. The possibility herein may be represented by an average value, or the like. A calculation manner of the possibility may be self-defined. For example, the possibility may be obtained through average value calculation according to the probability that the pixels in the candidate segmented regions belong to the target detection object, or obtained through weighted summation on the probabilities that the pixels in the candidate segmented regions belong to the target detection object. In addition, after the possibility that each of the candidate segmented regions is the target detection object region is obtained, non-target detection object regions are filtered out from the candidate segmented regions according to areas of the candidate segmented regions and the corresponding possibility, to obtain the target detection object region. The non-target detection object regions may be first filtered out from the candidate segmented regions according to the areas of the candidate segmented regions, and further filtered out from the candidate segmented regions according to the possibility that each of the candidate segmented regions is the target detection object region. For example, the non-target detection object regions are filtered out from candidate segmented regions whose areas are less than a preset area, and then are filtered out from candidate segmented regions whose corresponding average values are less than a preset threshold, to finally obtain the target detection object region.

Figure 20:
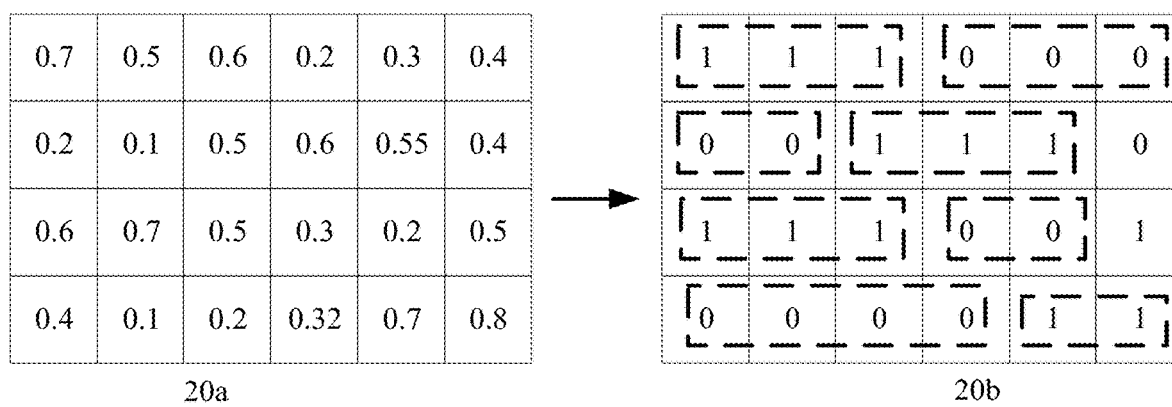
FIG. 20 is a schematic diagram of an interface of a step of generating a target detection object region according to an embodiment.

In an embodiment, FIG. 20 shows a schematic diagram of an interface of a step of generating a target detection object region according to an embodiment. 20a in FIG. 20 is a prediction diagram corresponding to a to-be-detected image generated by a target object detection model, and probabilities corresponding to pixels in the to-be-detected image exist in the prediction diagram. The prediction diagram shown in 20a is binarized to obtain a corresponding binarized prediction diagram 20b. A binarized threshold may be specifically selected for binarization, to obtain a binarized prediction diagram 20b. Then region segmentation may be performed on the binarized prediction diagram 20b, to obtain a candidate segmented region. As marked by the dashed line box in 20b, one dashed line box represents one candidate segmented region.

In addition, after a plurality of candidate segmented regions are obtained, to improve the detection accuracy of the target detection object region, candidate segmented regions may be filtered according to a preset condition. For example, filtering may be performed according to areas of the candidate segmented regions. Candidate segmented regions whose areas are less than the preset area may be filtered out. Finally, the target detection object region is obtained according to a relation degree to which pixels in the filtered candidate segmented regions belong to the target detection object. A dashed line box in 20b in FIG. 20 represents a candidate segmented region. The candidate segmented region includes a plurality of pixels. Probabilities corresponding to the pixels in the candidate segmented regions before binarization are obtained, and the target detection object region is further obtained according to the probabilities corresponding to the pixels in the candidate segmented regions. Obtaining the target detection object region according to the probabilities corresponding to the pixels in the candidate segmented regions may include: first calculating average values f the probabilities corresponding to the pixels in the candidate segmented regions, then filtering the candidate segmented regions according to the average values corresponding to the candidate segmented regions, where candidate segmented regions whose average values are less than the preset average value may be filtered out, and finally obtaining the target detection object region.

In an embodiment, the to-be-detected image is a cell section image, and the target detection object is dividing cells. Inputting the to-be-detected image into the target object detection model includes: inputting the cell section image into the target object detection model. Generating, by the target object detection model, a prediction diagram corresponding to the to-be-detected image, the prediction diagram describing a relation degree to which pixels of the to-be-detected image belong to the target detection object includes: generating, by the target object detection model, a dividing cell prediction diagram corresponding to the cell section image, the dividing cell prediction diagram describing a probability that pixels of the cell section image belong to a dividing cell. Performing region segmentation on the prediction diagram to obtain the target detection object region includes: performing region segmentation on the dividing cell prediction diagram to obtain a dividing cell region in the cell section image.

For example, in an application scenario of disease diagnosis and treatment, the to-be-detected image is a cell section image, the target detection object in the cell section image is dividing cells, the cell section image is inputted into the target object detection model, which generates a dividing cell prediction diagram corresponding to the cell section image, the dividing cell prediction diagram being used for describing a probability that pixels of the cell section image belong to a dividing cell; and region segmentation is performed on the dividing cell prediction diagram to obtain a dividing cell region in the cell section image.

The cell section image may be the stained cell section image shown in FIG. 10. The stained cell section image may be obtained in the following way: a relevant person makes a cell section, and slices the section into sheets by using a microscope slicing machine, and then places the sections on a slide for H&E staining; and the stained sections are scanned by a scanning electron microscope, to generate the stained cell section image. Cells in the cell section image include at least one of dividing cells and non-dividing cells. The cell section image shown in FIG. 11 or FIG. 12 may be used as the to-be-detected image.

In an embodiment, a step of training the target object detection model may include: obtaining a training sample image set, training sample images in the training sample image set including a plurality of target-type objects with marked sample centroids; determining a first region and a second region corresponding to each of the target-type objects according to a position of a sample centroid of the target-type object, the first region being a subregion of the second region, the first region and the second region having the same center, the center being the sample centroid of the corresponding target-type object; calculating, by using the object detection model, a first relation degree to which pixels of the first region of the target-type object belong to a target region; calculating, by using the object detection model, a second relation degree to which pixels of the target-type object beyond the second region belong to a background region; calculating a training loss value according to the first relation degree and the second relation degree; and adjusting a model parameter of the object detection model according to the training loss value, until a convergence condition is met, to obtain a target object detection model.

The foregoing process is described in detail in the schematic flowchart of the method for training an object detection model shown in FIG. 2 and details are not described herein again.

In an embodiment, a method for training an object detection model and a target object detection method are provided, and may include the following steps:

S1: Obtain a training sample image set, training sample images in the training sample image set including different types of objects, where target-type objects have marked sample centroids. The training sample images include cell section images, the target-type object is dividing cells, and a plurality of stained cell section images are obtained, the plurality of stained cell section images forming the training sample image set, where the plurality of stained cell section images may include different types of cells. For example, cells in the cell section images include at least one of dividing cells and non-dividing cells.

S2: Determine a first region and a second region corresponding to each of the target-type objects according to a position of a sample centroid of the target-type object, the first region being a subregion of the second region, the first region and the second region having the same center, the center being the sample centroid of the corresponding target-type object. S2 may further include the following substeps S2-1 to S2-3:

S2-1: Obtain a first preset radius and a second preset radius, the first preset radius being less than the second preset radius.

S2-2: Determine a first region corresponding to a current target-type object using a sample centroid of the current target-type object as a circle center and using the first preset radius as a radius.

S2-3: Determine a second region corresponding to the current target-type object using the sample centroid of the current target-type object as a circle center and using the second preset radius as a radius.

S3: Input training sample images in the training sample image set into the object detection model, which calculates a first relation degree to which pixels of the first region of each target-type object belong to the target region.

The target region is a region in which the dividing cell is located. S3 may further include the following substeps S3-1 to S3-3:

S3-1: Obtain a first pixel value corresponding to the pixels of the first region of the target-type object.

S3-2: Calculate a first sub-probability that the first pixel value of the first region of the target-type object belongs to the target region.

Calculating the first sub-probability that the first pixel value of the first region of the target-type object belongs to the target region may include: calculating, according to the model parameter of the object detection model, the first sub-probability that the first pixel value of the first region of the target-type object belongs to the target region.

S3-3: Collect statistics on first sub-probabilities corresponding to the target-type objects, to obtain the first relation degree.

S4: The object detection model calculates the second relation degree to which pixels beyond the second region of the target-type object belong to the background region. S4 may further include the following substeps S4-1 to S4-3:

S4-1: Obtain a second pixel value corresponding to the pixels beyond the second region of the target-type object.

S4-2: Calculate a second sub-probability that the second pixel value beyond the second region of the target-type object belongs to the background region.

Calculating the corresponding second sub-probability that the second pixel value beyond the second region of the target-type object belongs to the background region may include: calculating, according to the model parameter of the object detection model, the corresponding second sub-probability that the second pixel value beyond the second region of the target-type object belongs to the background region.

S4-3: Collect statistics on second sub-probabilities corresponding to the target-type objects, to obtain the second relation degree.

S5: Calculate a training loss value according to the first relation degree and the second relation degree. In S5, the training loss value L may be calculated through the following formula as follows:

$$L = -\sum_{n=1}^{N}\left(\sum_{x\in C1}\log P(1|x;W) + \sum_{x\in B}\log P(0|x;W)\right) + \lambda\sum_{n=1}^{N}\|W\|_2^2$$

where X is any pixel value; W is the model parameter of the object detection model; N is a quantity of the training sample images; C1 is the first region; P(1|x;W) is the first sub-probability that the pixel value X belongs to the target region, and represents a probability that the pixel value X belongs to the target region in a case that the model parameter is W; B is the background region beyond the second region; P(0|x;W) is the second sub-probability that the pixel value X belongs to the background region, and represents a probability that the pixel value X belongs to the background region in a case that the model parameter is W; L is the training loss value, a last term of the training loss value L is a regularization term, and the regularization term is used for constraining the model parameter W; λ is a weight factor, $$\sum_{x\in C1}\log P(1|x;W)$$

represents the first relation degree to which the pixels of the first region belong to the target region, and $$\sum_{x\in B}\log P(0|x;W)$$

represents the second relation degree to which the pixels beyond the second region belong to the background region.

S6: Adjust the model parameter of the object detection model according to the training loss value, until the convergence condition is met, to obtain the target object detection model.

S7. Obtain a to-be-detected image.

S8: Input the to-be-detected image into the target object detection model.

S9: The target object detection model generates a prediction diagram corresponding to the to-be-detected image, the prediction diagram describing a relation degree to which pixels of the to-be-detected image belong to the target detection object.

S9-1: Obtain a first prediction child diagram outputted by a first prediction subnetwork, the target object detection model including the first prediction subnetwork and a second prediction subnetwork, the second prediction subnetwork being a backward pooling layer of the first prediction subnetwork. S9 may further include the following substeps S9-1 to S9-5:

S9-2: Obtain a second prediction child diagram outputted by the second prediction subnetwork.

S9-3: Obtain a third prediction child diagram generated by an output layer of the target object detection model.

S9-4: Generate an intermediate prediction child diagram according to the second prediction child diagram and the third prediction child diagram.

S9-5: Generate a prediction diagram corresponding to the to-be-detected image according to the first prediction child diagram and the intermediate prediction child diagram.

S10: Perform region segmentation on the prediction diagram to obtain a target detection object region. S10 may further include the following substeps S10-1 to S10-3:

S10-1: Binarize the prediction diagram to obtain a corresponding binarized prediction diagram.

S10-2: Obtain a plurality of candidate segmented regions according to the binarized prediction diagram.

S10-3: Obtain a target detection object region according to a relation degree to which pixels in each candidate segmented region belong to a target detection object. S10-3 may further include the following substeps S10-3-1 and S10-3-2:

S10-3-1: Calculate, according to the relation degree to which the pixels in the candidate segmented regions belong to the target detection object, a possibility that each of the candidate segmented regions is the target detection object region.

S10-3-2: Filter out non-target detection object regions from the candidate segmented regions according to areas of the candidate segmented regions and the corresponding possibility, to obtain the target detection object region.

Figure 21:
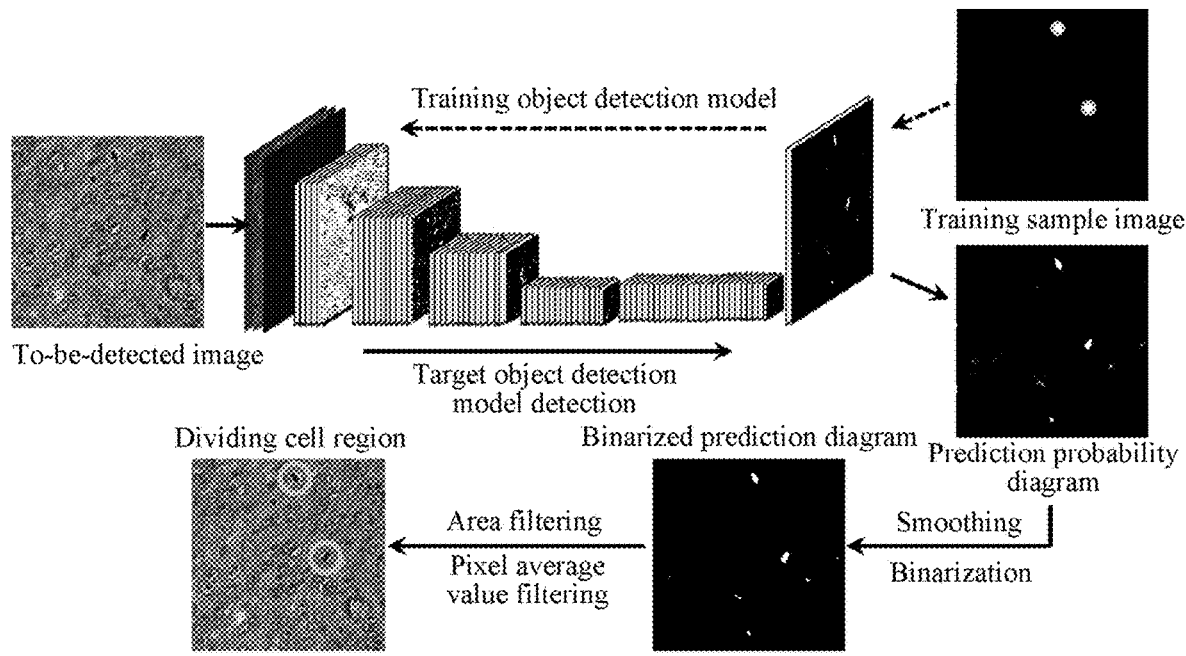
FIG. 21 is a schematic diagram of a principle of a method for training an object detection model and a target object detection method according to an embodiment.

In an application scenario of breast cancer diagnosis and treatment, FIG. 21 shows a schematic diagram of a principle of a method for training an object detection model and a target object detection method according to an embodiment. In the application scenario of breast cancer diagnosis and treatment, a trained target object detection model is used for detecting dividing cells in a histopathological picture of breasts, and finally can obtain the quantity of dividing cells, which helps diagnosis and grading of breast cancer.

First, the object detection model needs to be trained. Only a trained target object detection model can detect dividing cells from the histopathological picture of breasts. Before the object detection model is trained, a training sample image set needs to be obtained. A source of the training sample image set in FIG. 21 may be: a cut-off breast tumor tissue sent to a pathology lab for processing. The processing may include cutting the cut-off tumor tissue into smaller sections, cutting the sections into sheets by using a microscope slicing machine, and then placing the sections on a slide for H&E staining. The stained sections are scanned by a scanning electron microscope, to generate cell section images. A plurality of stained cell section images are formed into a training sample image set.

Then, each cell section image may include a plurality of cells. The cells may be divided into dividing cells and nondividing cells. A centroid of each cell is marked, and a center pixel of the cell may be marked as a sample centroid or a centroid of the cell may be marked as a sample centroid. This marking method is simple and marking is relatively rough. When all cells in all cell section images have marked sample centroids, the first preset radius and the second preset radius are obtained. The first preset radius needs to be less than the second preset radius. The first region corresponding to the current sample centroid is determined using the current sample centroid as a circle center and using the first preset radius as a radius. The second region corresponding to the current sample centroid is determined using the current sample centroid as a circle center and using the second preset radius as a radius. Finally, each sample centroid has a corresponding first region and second region. As shown in the training sample image shown in the upper right corner of FIG. 21, the small circle in the training sample image in FIG. 21 is the first region, and the big circle is the second region. The first region is a subregion of the second region, and the first region and the second region have the same center, the center being a corresponding sample centroid.

Next, cell section images of the determined first region and second region corresponding to each sample centroid are inputted into the object detection model as training sample images. The object detection model calculates a first probability that the pixels of the first region of each target-type object belongs to a dividing cell region and a second probability that the pixels beyond the second region of each target-type object belongs to the background region, and calculates a training loss value according to the first probability and the second probability. The training loss value may be calculated according to the following formula:

$$L = -\sum_{n=1}^{N}\left(\sum_{x \in C1} \log P(1 \mid x; W) + \sum_{x \in B} \log P(0 \mid x; W)\right) + \lambda \sum_{n=1}^{N} \|W\|_2^2$$

where X is any pixel value; W is the model parameter of the object detection model; N is a quantity of the training sample images; C1 is the first region; P(1|x;W) is the first sub-probability that the pixel value X belongs to the target region, and represents a probability that the pixel value X belongs to the target region in a case that the model parameter is W; B is the background region beyond the second region; P(0|x;W) is the second sub-probability that the pixel value X belongs to the background region, and represents a probability that a pixel value belongs to the background region in a case that the model parameter is W; L is the training loss value, a last term of the training loss value L is a regularization term, and the regularization term is used for constraining the model parameter W; λ is a weight factor, $$\sum_{x \in C1} \log P(1 \mid x; W)$$

represents the first probability that the pixels of the first region of the target-type object belong to the target region, and $$\sum_{x \in B} \log P(0 \mid x; W)$$

represents the second probability that the pixels beyond the second region of the target-type object belong to the background region.

Next, after the training loss value of the object detection model is obtained, the model parameter of the object detection model is adjusted according to the training loss value, until the convergence condition is met, to obtain the target object detection model. Specifically, W is adjusted according to the training loss value L to meet the convergence condition, and then a model parameter of each layer of the object detection model is optimized through a BP algorithm, and a final model parameter W is obtained through iteration for a plurality of times by using an SGD method, to further obtain the target object detection model.

However, a trained target object detection model can be used for detecting dividing cells in a pathological picture of a breast tissue, such as breast cancer, which is one of the most common cancers in females, and causes huge threats to health and life of patients. Early detection and early treatment of breast cancer are essential to reduce the mortality rate of the disease. According to the Nottingham grading system recommended by the World Health Organization, the histological grading assessment of the breast cancer relates to three morphological features: the formation of glandular tubes, nuclear pleomorphism, and the mitotic count. The dividing cell count indicates the invasion of tumors, and is of great significance to the diagnosis and grading of cancer. After the pathological tissue image of the breast tissue biopsy is sliced and stained, the pathological tissue image under a high-power microscope is inputted into the trained target object detection model as the to-be-detected image.

In addition, as shown in FIG. 21, the target object detection model detects the to-be-detected image, and generates a prediction probability diagram corresponding to the to-be-detected image, the prediction probability diagram describing a probability that pixels of the to-be-detected image belong to the target detection object. Next, the prediction probability diagram outputted by the target object detection model is binarized to obtain a corresponding binarized prediction diagram, and then pixels with the same grayscale value are grouped into a candidate segmented region according to the binarized prediction diagram, so that a plurality of candidate segmented regions are obtained. Finally, the candidate segmented regions are filtered by using the areas of the candidate segmented regions and probabilities corresponding to the pixels in the candidate segmented regions, to obtain a dividing cell region. As shown in the last picture in FIG. 21, the circles in the last picture of FIG. 21 represent the correctly detected two dividing cells. Filtering the candidate segmented regions by using the areas of the candidate segmented regions and the probabilities corresponding to the pixels in the candidate segmented regions to obtain the dividing cell region may be specifically filtering the candidate segmented regions, removing candidate segmented regions with excessively small areas, and removing candidate segmented regions whose pixel average probabilities values are excessively low, and the remaining region is the final dividing cell region.

It is to be understood that although the steps in the flowchart are sequentially shown according to indication of an arrow, the steps are not necessarily sequentially performed according to a sequence indicated by the arrow. Unless otherwise clearly specified in this specification, the steps are performed without any strict sequence limit, and may be performed in other orders. Besides, at least some steps in the flowchart may include a plurality of sub-steps or a plurality of stages, the sub-steps or stages are not necessarily performed at a same moment and may be performed at different moments, the sub-steps or stages are not necessarily sequentially performed, and the sub-steps or stages and at least some of other steps or sub-steps or stages of other steps may be performed in turn or alternately.

Figure 22:
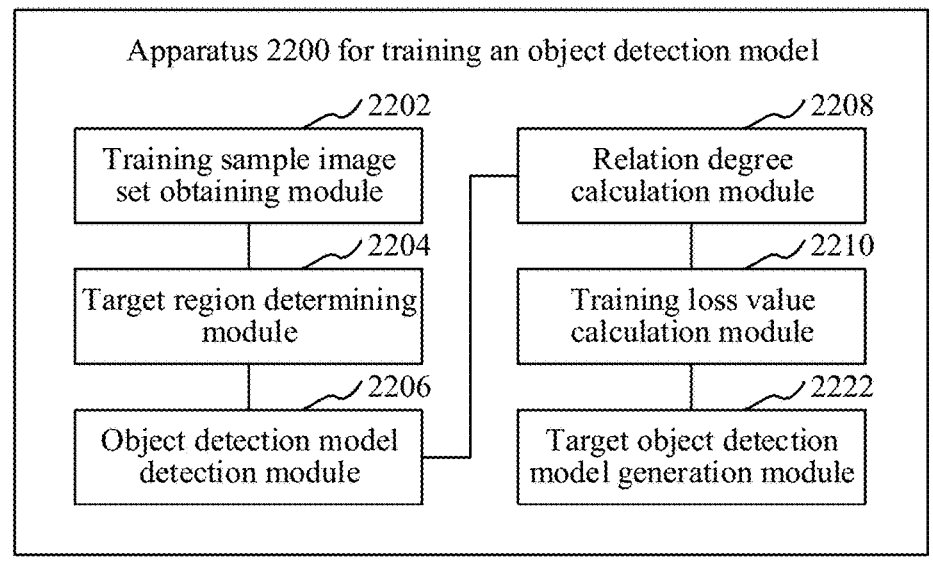
FIG. 22 is a structural block diagram of an apparatus for training an object detection model according to an embodiment.

As shown in FIG. 22, in an embodiment, an apparatus 2200 for training an object detection model is provided, including: a training sample image set obtaining module 2202, configured to obtain a training sample image set, training sample images in the training sample image set including a plurality of target-type objects with marked sample centroids; a target region determining module 2204, configured to determine a first region and a second region corresponding to each of the target-type objects according to a position of a sample centroid of the target-type object, the first region being a subregion of the second region, the first region and the second region having the same center, the center being the sample centroid of the corresponding target-type object; an object detection model detection module 2206, configured to calculate, by using the object detection model, a first relation degree to which pixels of the first region of the target-type object belong to a target region; a relation degree calculation module 2208, configured to calculate, by using the object detection model, a second relation degree to which pixels beyond the second region of the target-type object belongs to a background region; a training loss value calculation module 2210, configured to calculate a training loss value according to the first relation degree and the second relation degree; and a target object detection model generation module 2212, configured to adjust a model parameter of the object detection model according to the training loss value, until a convergence condition is met, to obtain a target object detection model.

Figure 23:
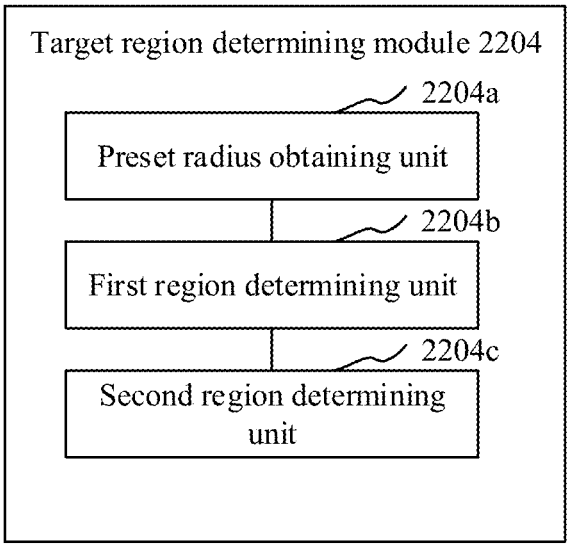
FIG. 23 is a structural block diagram of a target region determining module according to an embodiment.

In an embodiment, as shown in FIG. 23, the target region determining module 2204 includes: a preset radius obtaining unit 2204$a$, configured to obtain a first preset radius and a second preset radius, the first preset radius being less than the second preset radius. A first region determining unit 2204$b$ is configured to determine a first region of a current target-type object using a sample centroid of the current target-type object as a circle center and using the first preset radius as a radius. A second region determining unit 2204$c$ is configured to determine a second region of the current target-type object using the sample centroid of the current target-type object as a circle center and using the second preset radius as a radius.

In an embodiment, the object detection model detection module 2206 is further configured to obtain a first pixel value corresponding to the pixels of the first region of the target-type object, calculate a first sub-probability that the first pixel value of the first region of the target-type object belongs to the target region, and collect statistics on first sub-probabilities corresponding to the target-type objects, to obtain the first relation degree.

In an embodiment, the relation degree calculation module 2208 is further configured to obtain a second pixel value corresponding to the pixels beyond the second region of the target-type object; calculate, according to the model parameter of the object detection model, a second sub-probability that the second pixel value beyond the second region of the target-type object belongs to the background region; and collect statistics on second sub-probabilities corresponding to the target-type objects, to obtain the second relation degree.

In an embodiment, the training loss value calculation module 2210 is further configured to calculate, according to the model parameter of the object detection model, a first sub-probability that each of the pixels of the first region of the target-type object belongs to the target region; calculate, according to the model parameter of the object detection model, a second sub-probability that each of the pixels beyond the second region of the target-type object belongs to the background region; and calculate according to the first sub-probability and the second sub-probability to obtain the training loss value.

In an embodiment, the training loss value calculation module 2210 is further configured to calculate the training loss value according to the following formula. The calculation formula is shown as follows:

$$L = -\sum_{n=1}^{N}\left(\sum_{x \in C1} \log P(1 \mid x; W) + \sum_{x \in B} \log P(0 \mid x; W)\right) + \lambda \sum_{n=1}^{N} \|W\|_2^2$$

where X is any pixel value; W is the model parameter of the object detection model; N is a quantity of the training sample images; C1 is the first region; P(1|x;W) is the first sub-probability that the pixel value X belongs to the target region, and represents a probability that the pixel value X belongs to the target region in a case that the model parameter is W; B is the background region beyond the second region; P(0|x;W) is the second sub-probability that the pixel value X belongs to the background region, and represents a probability that the pixel value X belongs to the background region in a case that the model parameter is W; L is the training loss value, a last term of the training loss value L is a regularization term, and the regularization term is used for constraining the model parameter W; λ is a weight factor, $$\sum_{x \in C1} \log P(1 \mid x; W)$$

represents the first relation degree to which the pixels of the first region belong to the target region, and $$\sum_{x \in B} \log P(0 \mid x; W)$$

represents the second relation degree to which the pixels beyond the second region belong to the background region.

In an embodiment, the training sample images include cell section images, the target-type object is a dividing cell, and the training sample image set obtaining module 2202 is further configured to obtain a plurality of stained cell section images, the plurality of stained cell section images forming the training sample image set, where the plurality of stained cell section images include different types of cells, and cells in the cell section images include at least one of dividing cells and non-dividing cells.

Figure 24:
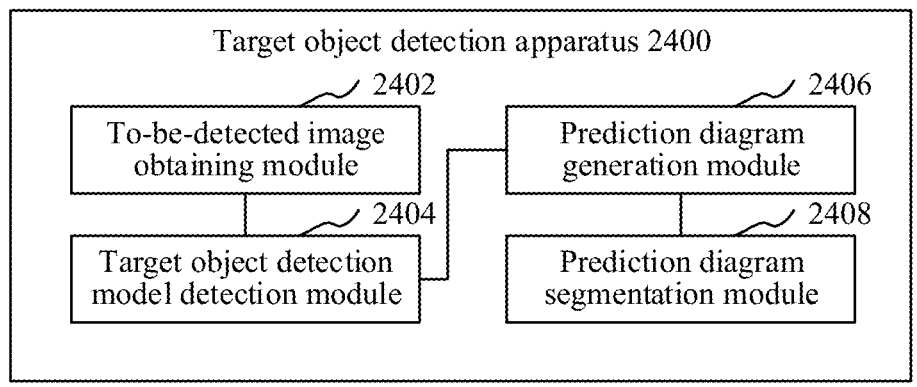
FIG. 24 is a structural block diagram of a target object detection apparatus according to an embodiment.

As shown in FIG. 24, in an embodiment, a target object detection apparatus 2400 is provided, including: a to-be-detected image obtaining module 2402, configured to obtain a to-be-detected image; and a target object detection model detection module 2404, configured to input the to-be-detected image into a target object detection model, the target object detection model being obtained by performing parameter adjustment on an initial object detection model according to a training loss value, the training loss value being obtained through calculation according to target pixels determined according to a first region and a second region, the first region and the second region being determined according to a position of a sample centroid of a target-type object in a training sample image, the target pixels including pixels of the first region of the target-type object and pixels beyond the second region of the target-type object; a prediction diagram generation module 2406, configured to generate, by the target object detection model, a prediction diagram corresponding to the to-be-detected image, the prediction diagram describing a relation degree to which pixels of the to-be-detected image belong to a target detection object; and a prediction diagram segmentation module 2408, configured to perform region segmentation on the prediction diagram to obtain a target detection object region.

Figure 25:
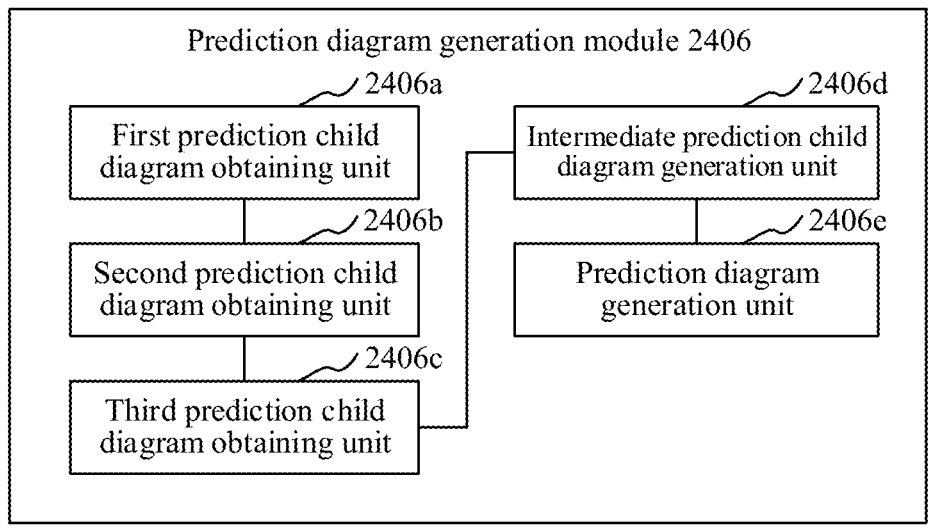
FIG. 25 is a structural block diagram of a prediction diagram generation module according to an embodiment.

In an embodiment, as shown in FIG. 25, the target object detection model includes a first prediction subnetwork and a second prediction subnetwork, the second prediction subnetwork being a backward pooling layer of the first prediction subnetwork. The prediction diagram generation module 2406 includes: a first prediction child diagram obtaining unit 2406a, configured to obtain a first prediction child diagram outputted by the first prediction subnetwork; a second prediction child diagram obtaining unit 2406b, configured to obtain a second prediction child diagram outputted by the second prediction subnetwork; a third prediction child diagram obtaining unit 2406c, configured to obtain a third prediction child diagram generated by an output layer of the target object detection model; an intermediate prediction child diagram generation unit 2406d, configured to generate an intermediate prediction child diagram according to the second prediction child diagram and the third prediction child diagram; and a prediction diagram generation unit 2406e, configured to generate the prediction diagram corresponding to the to-be-detected image according to the first prediction child diagram and the intermediate prediction child diagram.

Figure 26:
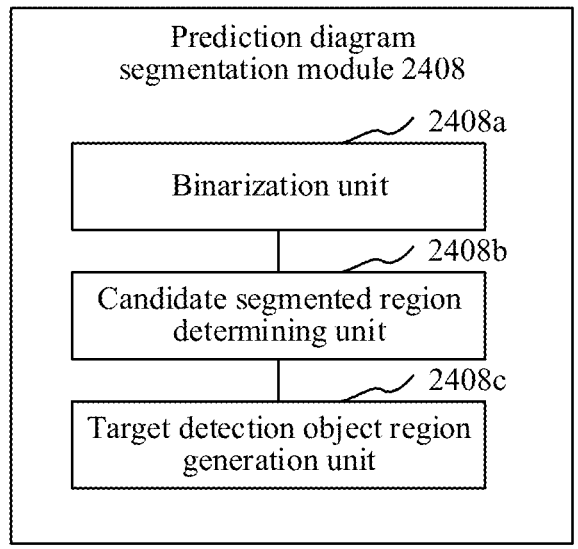
FIG. 26 is a structural block diagram of a prediction diagram segmentation module according to an embodiment.

In an embodiment, as shown in FIG. 26, the prediction diagram segmentation module 2408 includes: a binarization unit 2408a, configured to binarize a prediction diagram to obtain a corresponding binarized prediction diagram; a candidate segmented region determining unit 2408b, configured to obtain a plurality of candidate segmented regions according to the binarized prediction diagram; and a target detection object region generation unit 2408c, configured to obtain the target detection object region according to a relation degree to which pixels in the candidate segmented regions belong to the target detection object.

In an embodiment, the target detection object region generation unit 2408c is further configured to calculate, according to the relation degree to which the pixels in the candidate segmented regions belong to the target detection object, a possibility that each of the candidate segmented regions is the target detection object region; and filter out non-target detection object regions from the candidate segmented regions according to areas of the candidate segmented regions and the corresponding possibility, to obtain the target detection object region.

In an embodiment, the to-be-detected image is a cell section image, the target detection object is a dividing cell, and the target object detection apparatus 2400 is further configured to input the cell section image into the target object detection model, which generates a dividing cell prediction diagram corresponding to the cell section image, the dividing cell prediction diagram describing a probability that pixels of the cell section image belong to a dividing cell, and region segmentation is performed on the dividing cell prediction diagram to obtain a dividing cell region in the cell section image.

In an embodiment, the target object detection apparatus 2400 is further configured to: obtain a training sample image set, training sample images in the training sample image set including different types of objects, the target-type objects having marked sample centroids; determine a first region and a second region corresponding to each of the target-type objects according to a position of a sample centroid of the target-type object, the first region being a subregion of the second region, the first region and the second region having the same center, the center being the sample centroid of the corresponding target-type object; input the training sample images in the training sample image set into the object detection model, calculate, by using the object detection model, a first relation degree to which pixels of the first region of the target-type object belong to a target region; calculate, by using the object detection model, a second relation degree to which pixels beyond the second region of the target-type object belongs to a background region;

calculate a training loss value according to the first relation degree and the second relation degree; and adjust a model parameter of the object detection model according to the training loss value, until a convergence condition is met, to obtain a target object detection model.

Figure 27:
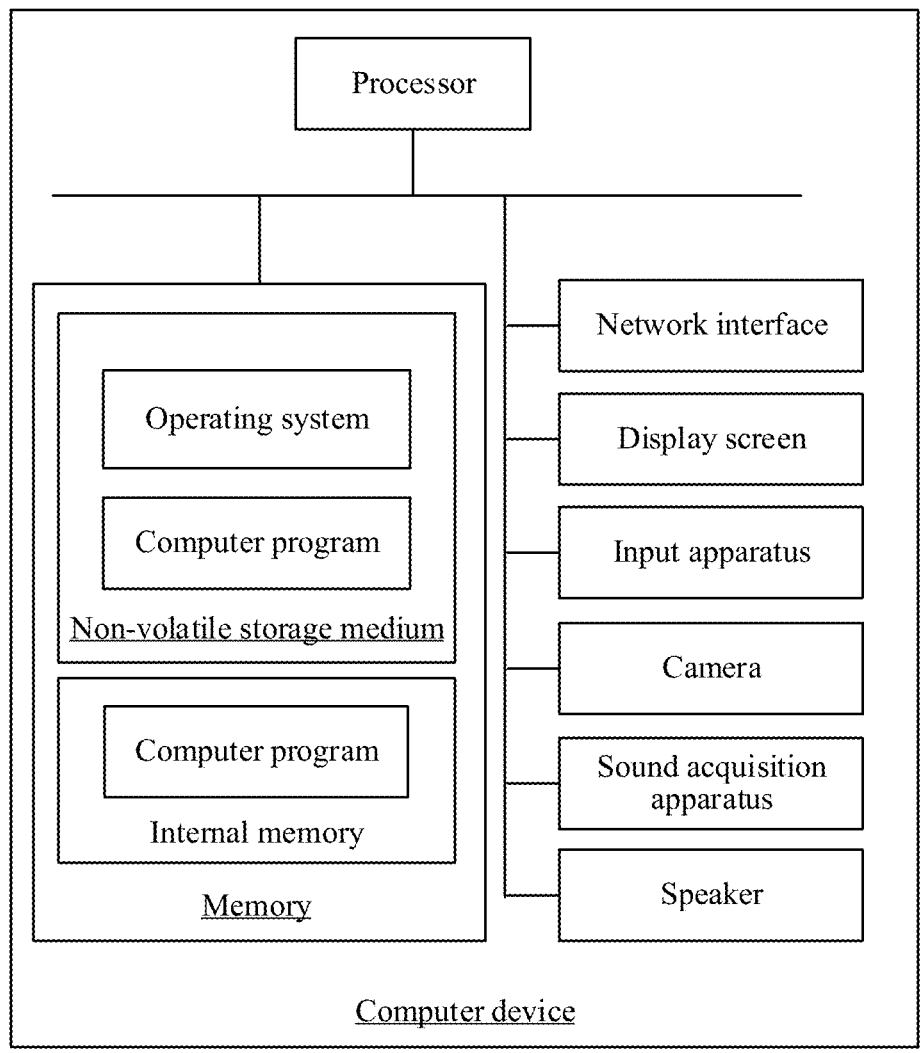
FIG. 27 is a structural block diagram of a computer device according to an embodiment.

FIG. 27 is a diagram of an internal structure of a computer device in an embodiment. The computer device may be specifically the terminal 110 or the server 120 in FIG. 1. As shown in FIG. 27, the computer device includes a processor, a memory, a network interface, an input apparatus, and a display screen that are connected by a system bus. The memory includes a non-volatile storage medium and an internal memory. The non-volatile storage medium of the computer device stores an operating system and may further store a computer program, the computer program, when executed by the processor, causing the processor to implement a method for training an object detection model and a target object detection method. The internal memory may also store a computer program, the computer program, when executed by the processor, causing the processor to perform the method for training an object detection model and the target object detection method. The display screen of the computer device may be a liquid crystal display screen or an e-ink display screen. The input apparatus of the computer device may be a touch layer covering the display screen, or a button, a trackball, or a touchpad disposed on a housing of the computer device, or an external keyboard, touchpad, mouse, or the like. If the computer device is the server 120, the computer device does not include the display screen. Only when the computer device is the terminal 110, the computer device includes a display screen.

A person skilled in the art may understand that, the structure shown in FIG. 27 is only a block diagram of a part of a structure related to a solution of this application and does not limit the computer device to which the solution of this application is applied. Specifically, the computer device may include more or fewer components than those in FIG. 27, or include a combination of some components, or include different component layouts.

In an embodiment, the apparatus for training an object detection model and the target object detection apparatus provided in this application may be implemented in a form of a computer program, and the computer program may be run on the computer device shown in FIG. 27. The memory of the computer device may store program modules that form the apparatus for training the object detection model and the target object detection apparatus.

In an embodiment, a computer device is provided, including a memory and a processor, the memory storing a computer program, the computer program, when executed by the processor, causing the processor to perform the following steps:

obtaining a training sample image set, training sample images in the training sample image set including a plurality of target-type objects with marked sample centroids; determining a first region and a second region corresponding to each of the target-type objects according to a position of a sample centroid of the target-type object, the first region being a subregion of the second region, the first region and the second region having the same center, the center being the sample centroid of the corresponding target-type object; calculating, by using the object detection model, a first relation degree to which pixels of the first region of the target-type object belong to a target region; calculating, by using the object detection model, a second relation degree to which pixels beyond the second region of the target-type object belong to a background region; calculating a training loss value according to the first relation degree and the second relation degree; and adjusting a model parameter of the object detection model according to the training loss value, until a convergence condition is met, to obtain a target object detection model.

In an embodiment, when the computer program is executed by the processor, the processor is caused to perform the following steps: obtaining a first preset radius and a second preset radius, the first preset radius being less than the second preset radius; determining a first region corresponding to a current target-type object using a sample centroid of the current target-type object as a circle center and using the first preset radius as a radius; and determining a second region corresponding to the current target-type object using the sample centroid of the current target-type object as a circle center and using the second preset radius as a radius. In an embodiment, when the computer program is executed by the processor, the processor is caused to perform the following steps: obtaining a first pixel value corresponding to the pixels of the first region of the target-type object; calculating, according to the model parameter of the object detection model, a first sub-probability that the first pixel value of the first region of the target-type object belongs to the target region; and collecting statistics on first sub-probabilities corresponding to the target-type objects, to obtain the first relation degree; obtaining a second pixel value corresponding to the pixels beyond the second region of the target-type object; calculating, according to the model parameter of the object detection model, a second sub-probability that the second pixel value beyond the second region of the target-type object belongs to the background region; and collecting statistics on second sub-probabilities corresponding to the target-type objects, to obtain the second relation degree.

In an embodiment, when the computer program is executed by the processor, the processor is caused to perform the following steps: calculating, according to the model parameter of the object detection model, a first sub-probability that the pixels of the first region of the target-type object belong to the target region; and calculating, according to the model parameter of the object detection model, a second sub-probability that pixels beyond the second region of the target-type object belong to the background region; and calculating according to the first sub-probability and the second sub-probability to obtain the training loss value.

In an embodiment, when the computer program is executed by the processor, the processor is caused to perform the following step: calculating a training loss value according to the first relation degree and the second relation degree, where a calculation formula is as follows:

$$L = -\sum_{n=1}^{N}\left(\sum_{x \in C1} \log P(1 \mid x; W) + \sum_{x \in B} \log P(0 \mid x; W)\right) + \lambda \sum_{n=1}^{N} \|W\|_2^2$$

where X is any pixel value; W is the model parameter of the object detection model; N is a quantity of the training sample images; C1 is the first region; P(1|x;W) is the first sub-probability that the pixel value X belongs to the target region, and represents a probability that the pixel value X belongs to the target region in a case that the model parameter is W; B is the background region beyond the second region; P(0|x;W) is the second sub-probability that the pixel value X belongs to the background region, and represents a probability that the pixel value X belongs to the background region in a case that the model parameter is W; L is the training loss value, a last term of the training loss value L is a regularization term, and the regularization term is used for constraining the model parameter W; λ is a weight factor, $$\sum_{x \in C1} \log P(1 \mid x; W)$$

represents the first relation degree to which the pixels of the first region belong to the target region, and $$\sum_{x \in B} \log P(0 \mid x; W)$$

represents the second relation degree to which the pixels beyond the second region belong to the background region.

In an embodiment, when the computer program is executed by the processor, the processor is caused to perform the following steps: obtaining a plurality of stained cell section images, the plurality of stained cell section images forming the training sample image set, where the plurality of stained cell section images include different types of cells, and cells in the cell section images include at least one of dividing cells and non-dividing cells.

In an embodiment, a computer device is provided, including a memory and a processor, the memory storing a computer program, the computer program, when executed by the processor, causing the processor to perform the following steps: obtaining a to-be-detected image; inputting the to-be-detected image into a target object detection model, the target object detection model being obtained by performing parameter adjustment on an initial object detection model according to a training loss value, the training loss value being obtained through calculation according to target pixels determined according to a first region and a second region, the first region and the second region being determined according to a position of a sample centroid of a target-type object in a training sample image, the target pixels including pixels of the first region of the target-type object and pixels beyond the second region of the target-type object; generating, by the target object detection model, a prediction diagram corresponding to the to-be-detected image, the prediction diagram describing a relation degree to which pixels of the to-be-detected image belong to a target detection object; and performing region segmentation on the prediction diagram to obtain a target detection object region.

In an embodiment, when the computer program is executed by the processor, the processor is caused to perform the following steps: obtaining a first prediction child diagram outputted by the first prediction subnetwork; obtaining a second prediction child diagram outputted by the second prediction subnetwork; obtaining a third prediction child diagram generated by an output layer of the target object detection model; generating an intermediate prediction child diagram according to the second prediction child diagram and the third prediction child diagram; and generating the prediction diagram corresponding to the to-be-detected image according to the first prediction child diagram and the intermediate prediction child diagram.

In an embodiment, when the computer program is executed by the processor, the processor is caused to perform the following steps: binarizing the prediction diagram to obtain a corresponding binarized prediction diagram; obtaining a plurality of candidate segmented regions according to the binarized prediction diagram; and obtaining the target detection object region according to a relation degree to which pixels in the candidate segmented regions belong to the target detection object.

In an embodiment, when the computer program is executed by the processor, the processor is caused to perform the following steps: calculating, according to the relation degree to which the pixels in the candidate segmented regions belong to the target detection object, a possibility that each of the candidate segmented regions is the target detection object region; and filtering out non-target detection object regions from the candidate segmented regions according to areas of the candidate segmented regions and the corresponding possibility, to obtain the target detection object region.

In an embodiment, when the computer program is executed by the processor, the processor is caused to perform the following steps: inputting the cell section image into the target object detection model; generating, by the target object detection model, a dividing cell prediction diagram corresponding to the cell section image, the dividing cell prediction diagram describing a probability that pixels of the cell section image belong to a dividing cell; and performing region segmentation on the dividing cell prediction diagram to obtain a dividing cell region in the cell section image.

In an embodiment, a computer-readable storage medium is provided, storing a computer program, the computer program, when executed by a processor, causing the processor to perform the following steps:

obtaining a training sample image set, training sample images in the training sample image set including a plurality of target-type objects with marked sample centroids; determining a first region and a second region corresponding to each of the target-type objects according to a position of a sample centroid of the target-type object, the first region being a subregion of the second region, the first region and the second region having the same center, the center being the sample centroid of the corresponding target-type object; calculating, by using the object detection model, a first relation degree to which pixels of the first region of the target-type object belong to a target region; calculating, by using the object detection model, a second relation degree to which pixels beyond the second region of the target-type object belong to a background region; calculating a training loss value according to the first relation degree and the second relation degree; and adjusting a model parameter of the object detection model according to the training loss value, until a convergence condition is met, to obtain a target object detection model.

In an embodiment, when the computer program is executed by the processor, the processor is caused to perform the following steps: obtaining a first preset radius and a second preset radius, the first preset radius being less than the second preset radius; determining a first region corresponding to a current target-type object using a sample centroid of the current target-type object as a circle center and using the first preset radius as a radius; and determining a second region corresponding to the current target-type object using the sample centroid of the current target-type object as a circle center and using the second preset radius as a radius.

In an embodiment, when the computer program is executed by the processor, the processor is caused to perform the following steps: obtaining a first pixel value corresponding to the pixels of the first region of the target-type object; calculating, according to the model parameter of the object detection model, a first sub-probability that the first pixel value of the first region of the target-type object belongs to the target region; and collecting statistics on first sub-probabilities corresponding to the target-type objects, to obtain the first relation degree; obtaining a second pixel value corresponding to the pixels beyond the second region of the target-type object; calculating, according to the model parameter of the object detection model, a second sub-probability that the second pixel value beyond the second region of the target-type object belongs to the background region; and collecting statistics on second sub-probabilities corresponding to the target-type objects, to obtain the second relation degree.

In an embodiment, when the computer program is executed by the processor, the processor is caused to perform the following steps: calculating, according to the model parameter of the object detection model, a first sub-probability that the pixels of the first region of the target-type object belong to the target region; and calculating, according to the model parameter of the object detection model, a second sub-probability that pixels beyond the second region of the target-type object belong to the background region; and calculating according to the first sub-probability and the second sub-probability to obtain the training loss value.

In an embodiment, when the computer program is executed by the processor, the processor is caused to perform the following step: calculating a training loss value according to the first relation degree and the second relation degree, where a calculation formula is as follows:

$$L = -\sum_{n=1}^{N}\left(\sum_{x \in C1}\log P(1\mid x; W) + \sum_{x \in B}\log P(0\mid x; W)\right) + \lambda\sum_{n=1}^{N}\|W\|_2^2$$

where X is any pixel value; W is the model parameter of the object detection model; N is a quantity of the training sample images; C1 is the first region; P(1|x;W) is the first sub-probability that the pixel value X belongs to the target region, and represents a probability that the pixel value X belongs to the target region in a case that the model parameter is W; B is the background region beyond the second region; P(0|x;W) is the second sub-probability that the pixel value X belongs to the background region, and represents a probability that the pixel value X belongs to the background region in a case that the model parameter is W; L is the training loss value, a last term of the training loss value L is a regularization term, and the regularization term is used for constraining the model parameter W; $\lambda$ is a weight factor, $$\sum_{x \in C1}\log P(1\mid x; W)$$

represents the first relation degree to which the pixels of the first region belong to the target region, and $$\sum_{x \in B}\log P(0\mid x; W)$$

represents the second relation degree to which the pixels beyond the second region belong to the background region.

In an embodiment, when the computer program is executed by the processor, the processor is caused to perform the following steps: obtaining a plurality of stained cell section images, the plurality of stained cell section images forming the training sample image set, where the plurality of stained cell section images include different types of cells, and cells in the cell section images include at least one of dividing cells and non-dividing cells.

In an embodiment, a computer-readable storage medium is provided, storing a computer program, the computer program, when executed by the processor, causing the processor to perform the following steps: obtaining a to-be-detected image; inputting the to-be-detected image into a target object detection model, the target object detection model being obtained by performing parameter adjustment on an initial object detection model according to a training loss value, the training loss value being obtained through calculation according to target pixels determined according to a first region and a second region, the first region and the second region being determined according to a position of a sample centroid of a target-type object in a training sample image, the target pixels including pixels of the first region of the target-type object and pixels beyond the second region of the target-type object; generating, by the target object detection model, a prediction diagram corresponding to the to-be-detected image, the prediction diagram describing a relation degree to which pixels of the to-be-detected image belong to a target detection object; and performing region segmentation on the prediction diagram to obtain a target detection object region.

In an embodiment, when the computer program is executed by the processor, the processor is caused to perform the following steps: obtaining a first prediction child diagram outputted by the first prediction subnetwork; obtaining a second prediction child diagram outputted by the second prediction subnetwork; obtaining a third prediction child diagram generated by an output layer of the target object detection model; generating an intermediate prediction child diagram according to the second prediction child diagram and the third prediction child diagram; and generating the prediction diagram corresponding to the to-be-detected image according to the first prediction child diagram and the intermediate prediction child diagram.

In an embodiment, when the computer program is executed by the processor, the processor is caused to perform the following steps: binarizing the prediction diagram to obtain a corresponding binarized prediction diagram; obtaining a plurality of candidate segmented regions according to the binarized prediction diagram; and obtaining the target detection object region according to a relation degree to which pixels in the candidate segmented regions belong to the target detection object.

In an embodiment, when the computer program is executed by the processor, the processor is caused to perform the following steps: calculating, according to the relation degree to which the pixels in the candidate segmented regions belong to the target detection object, a possibility that each of the candidate segmented regions is the target detection object region; and filtering out non-target detection object regions from the candidate segmented regions according to areas of the candidate segmented regions and the corresponding possibility, to obtain the target detection object region.

In an embodiment, when the computer program is executed by the processor, the processor is caused to perform the following steps: inputting the cell section image into the target object detection model; generating, by the target object detection model, a dividing cell prediction diagram corresponding to the cell section image, the dividing cell prediction diagram describing a probability that pixels of the cell section image belong to a dividing cell; and performing region segmentation on the dividing cell prediction diagram to obtain a dividing cell region in the cell section image.

A person of ordinary skill in the art may understand that all or some of the processes of the methods in the foregoing embodiments may be implemented by a computer program instructing relevant hardware. The program may be stored in a non-volatile computer-readable storage medium. When the program is executed, the processes of the foregoing method embodiments are performed. Any reference to a memory, a storage, a database, or another medium used in the various embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a Rambus direct RAM (RDRAM), a direct Rambus dynamic RAM (DRDRAM), and a Rambus dynamic RAM (RDRAM).

The technical features in the foregoing embodiments may be randomly combined. To make the description concise, not all possible combinations of the technical features in the foregoing embodiments are described. However, combinations of the technical features shall all be considered as falling within the scope described in this specification provided that the combinations of the technical features do not conflict with each other.

The foregoing embodiments show only several implementations of this application and are described in detail, which, however, are not to be construed as a limitation to the patent scope of this application. A person of ordinary skill in the art may further make variations and improvements without departing from the ideas of this application, which all fall within the protection scope of this application. Therefore, the protection scope of this patent application is subject to the protection scope of the appended claims.

What is claimed is:

1. A method for training an object detection model, performed by a computer device, the method comprising:
    obtaining a training sample image set, training sample images in the training sample image set comprising a plurality of target-type objects with marked sample centroids;
    determining a first region and a second region corresponding to each of the target-type objects according to a position of a sample centroid of the target-type object, the first region being a subregion of the second region, the first region and the second region having the same center, the center being the sample centroid of the corresponding target-type object;
    calculating, by using an object detection model, a first relation degree to which pixels of the first region of the target-type object belong to a target region;
    calculating, by using the object detection model, a second relation degree to which pixels beyond the second region of the target-type object belong to a background region;
    calculating a training loss value according to the first relation degree and the second relation degree; and
    adjusting the object detection model according to the training loss value, until a convergence condition is met, to obtain a target object detection model.

2. The method according to claim 1, wherein the determining a first region and a second region corresponding to each of the target-type objects according to a position of a sample centroid of the target-type object comprises:
    obtaining a first preset radius and a second preset radius, the first preset radius being less than the second preset radius;
    determining a first region corresponding to a current target-type object using a sample centroid of the current target-type object as a circle center and using the first preset radius as a radius; and
    determining a second region corresponding to the current target-type object using the sample centroid of the current target-type object as a circle center and using the second preset radius as a radius.

3. The method according to claim 1, wherein the calculating, by using the object detection model, a first relation degree to which pixels of the first region of the target-type object belong to a target region comprises:
    obtaining a first pixel value corresponding to the pixels of the first region of the target-type object;
    calculating, according to the object detection model, a first sub-probability that the first pixel value of the first region of the target-type object belongs to the target region;
    collecting statistics on first sub-probabilities corresponding to the target-type object, to obtain the first relation degree; and
    the calculating, by using the object detection model, a second relation degree to which pixels beyond the second region of the target-type object belong to a background region comprises:
    obtaining a second pixel value corresponding to the pixels beyond the second region of the target-type object;
    calculating, according to the object detection model, a second sub-probability that the second pixel value beyond the second region of the target-type object belongs to the background region; and
    collecting statistics on second sub-probabilities corresponding to the target-type object, to obtain the second relation degree.

4. The method according to claim 3, wherein the calculating a training loss value according to the first relation degree and the second relation degree is performed by using the following calculation formula:

$$L = -\sum_{n=1}^{N} \left( \sum_{x \in C1} \log P(1 \mid x; W) + \sum_{x \in B} \log P(0 \mid x; W) \right) + \lambda \sum_{n=1}^{N} \|W\|_2^2$$

wherein X is any pixel value; W is a model parameter of the object detection model; N is a quantity of the training sample images; C1 is the first region; P(1|x;W) is the first sub-probability that the pixel value X belongs to the target region, and represents a probability that the pixel value X belongs to the target region in a case that the model parameter is W; B is the background region beyond the second region; P(0|x;W) is the second sub-probability that the pixel value X belongs to the background region, and represents a probability that the pixel value X belongs to the background region in a case that the model parameter is W; L is the training loss value, a last term of the training loss value L is a regularization term, and the regularization term is used for constraining the model parameter W; λ is a weight factor, $$\sum_{x \in C1} \log P(1 \mid x; W)$$

represents the first relation degree to which the pixels of the first region belong to the target region, and $$\sum_{x \in B} \log P(0 \mid x; W)$$

represents the second relation degree to which the pixels beyond the second region belong to the background region.

5. The method according to claim 1, wherein the calculating a training loss value according to the first relation degree and the second relation degree comprises:
calculating, according to the object detection model, a first sub-probability that each of the pixels of the first region of the target-type object belongs to the target region;
calculating, according to the object detection model, a second sub-probability that each of the pixels beyond the second region of the target-type object belongs to the background region; and
calculating according to the first sub-probability and the second sub-probability to obtain the training loss value.

6. The method according to claim 1, wherein the training sample images comprise cell section images, the target-type object is a dividing cell, and the obtaining a training sample image set comprises:
obtaining a plurality of stained cell section images, the plurality of stained cell section images forming the training sample image set, wherein
the plurality of stained cell section images comprise different types of cells, and cells in the cell section images comprise at least one of dividing cells and non-dividing cells.

7. The method according to claim 1, further comprising:
obtaining a to-be-detected image;
inputting the to-be-detected image into the target object detection model;
generating, by the target object detection model, a prediction diagram corresponding to the to-be-detected image, the prediction diagram describing a relation degree to which pixels of the to-be-detected image belong to a target detection object; and
performing region segmentation on the prediction diagram to obtain a target detection object region.

8. The method according to claim 7, wherein the target object detection model comprises a first prediction subnetwork and a second prediction subnetwork, the second prediction subnetwork being a backward pooling layer of the first prediction subnetwork, and the generating, by the target object detection model, a prediction diagram corresponding to the to-be-detected image comprises:
obtaining a first prediction child diagram outputted by the first prediction subnetwork;
obtaining a second prediction child diagram outputted by the second prediction subnetwork;
obtaining a third prediction child diagram generated by an output layer of the target object detection model;
generating an intermediate prediction child diagram according to the second prediction child diagram and the third prediction child diagram; and
generating the prediction diagram corresponding to the to-be-detected image according to the first prediction child diagram and the intermediate prediction child diagram.

9. The method according to claim 7, wherein the performing region segmentation on the prediction diagram to obtain a target detection object region comprises:
binarizing the prediction diagram to obtain a corresponding binarized prediction diagram;
obtaining a plurality of candidate segmented regions according to the binarized prediction diagram; and
obtaining the target detection object region according to a relation degree to which pixels in the candidate segmented regions belong to the target detection object.

10. The method according to claim 9, wherein the obtaining the target detection object region according to a relation degree to which pixels in the candidate segmented regions belong to the target detection object comprises:
calculating, according to the relation degree to which the pixels in the candidate segmented regions belong to the target detection object, a possibility that each of the candidate segmented regions is the target detection object region; and
filtering out non-target detection object regions from the candidate segmented regions according to areas of the candidate segmented regions and the corresponding possibility, to obtain the target detection object region.

11. The method according to claim 7, wherein the to-be-detected image is a cell section image, the target detection object is a dividing cell, and the inputting the to-be-detected image into a target object detection model comprises:
inputting the cell section image into the target object detection model;
the generating, by the target object detection model, a prediction diagram corresponding to the to-be-detected image, the prediction diagram describing a relation degree to which pixels of the to-be-detected image belong to a target detection object comprises:
generating, by the target object detection model, a dividing cell prediction diagram corresponding to the cell section image, the dividing cell prediction diagram describing a probability that pixels of the cell section image belong to a dividing cell; and
the performing region segmentation on the prediction diagram to obtain a target detection object region comprises:
performing region segmentation on the dividing cell prediction diagram to obtain a dividing cell region in the cell section image.

12. A computer device, comprising a memory and a processor, the memory storing a plurality of computer programs that, when executed by the processor, cause the computer device to perform a plurality of operations including:

obtaining a training sample image set, training sample images in the training sample image set comprising a plurality of target-type objects with marked sample centroids;

determining a first region and a second region corresponding to each of the target-type objects according to a position of a sample centroid of the target-type object, the first region being a subregion of the second region, the first region and the second region having the same center, the center being the sample centroid of the corresponding target-type object;

calculating, by using an object detection model, a first relation degree to which pixels of the first region of the target-type object belong to a target region;

calculating, by using the object detection model, a second relation degree to which pixels beyond the second region of the target-type object belong to a background region;

calculating a training loss value according to the first relation degree and the second relation degree; and adjusting the object detection model according to the training loss value, until a convergence condition is met, to obtain a target object detection model.

13. The computer device according to claim 12, wherein the determining a first region and a second region corresponding to each of the target-type objects according to a position of a sample centroid of the target-type object comprises:

obtaining a first preset radius and a second preset radius, the first preset radius being less than the second preset radius;

determining a first region corresponding to a current target-type object using a sample centroid of the current target-type object as a circle center and using the first preset radius as a radius; and determining a second region corresponding to the current target-type object using the sample centroid of the current target-type object as a circle center and using the second preset radius as a radius.

14. The computer device according to claim 12, wherein the calculating, by using the object detection model, a first relation degree to which pixels of the first region of the target-type object belong to a target region comprises:

obtaining a first pixel value corresponding to the pixels of the first region of the target-type object;

calculating, according to the object detection model, a first sub-probability that the first pixel value of the first region of the target-type object belongs to the target region;

collecting statistics on first sub-probabilities corresponding to the target-type object, to obtain the first relation degree;

obtaining a second pixel value corresponding to the pixels beyond the second region of the target-type object;

calculating, according to the object detection model, a second sub-probability that the second pixel value beyond the second region of the target-type object belongs to the background region; and collecting statistics on second sub-probabilities corresponding to the target-type object, to obtain the second relation degree.

15. The computer device according to claim 12, wherein the calculating a training loss value according to the first relation degree and the second relation degree comprises:

calculating, according to the object detection model, a first sub-probability that each of the pixels of the first region of the target-type object belongs to the target region;

calculating, according to the object detection model, a second sub-probability that each of the pixels beyond the second region of the target-type object belongs to the background region; and calculating according to the first sub-probability and the second sub-probability to obtain the training loss value.

16. The computer device according to claim 12, wherein the plurality of operations further comprise:

obtaining a to-be-detected image;

inputting the to-be-detected image into the target object detection model;

generating, by the target object detection model, a prediction diagram corresponding to the to-be-detected image, the prediction diagram describing a relation degree to which pixels of the to-be-detected image belong to a target detection object; and performing region segmentation on the prediction diagram to obtain a target detection object region.

17. The computer device according to claim 16, wherein the target object detection model comprises a first prediction subnetwork and a second prediction subnetwork, the second prediction subnetwork being a backward pooling layer of the first prediction subnetwork, and the generating, by the target object detection model, a prediction diagram corresponding to the to-be-detected image comprises:

obtaining a first prediction child diagram outputted by the first prediction subnetwork;

obtaining a second prediction child diagram outputted by the second prediction subnetwork;

obtaining a third prediction child diagram generated by an output layer of the target object detection model;

generating an intermediate prediction child diagram according to the second prediction child diagram and the third prediction child diagram; and generating the prediction diagram corresponding to the to-be-detected image according to the first prediction child diagram and the intermediate prediction child diagram.

18. The computer device according to claim 16, wherein the performing region segmentation on the prediction diagram to obtain a target detection object region comprises:

binarizing the prediction diagram to obtain a corresponding binarized prediction diagram;

obtaining a plurality of candidate segmented regions according to the binarized prediction diagram; and obtaining the target detection object region according to a relation degree to which pixels in the candidate segmented regions belong to the target detection object.

19. The computer device according to claim 16, wherein the to-be-detected image is a cell section image, the target detection object is a dividing cell, and the inputting the to-be-detected image into a target object detection model comprises:

inputting the cell section image into the target object detection model;

generating, by the target object detection model, a dividing cell prediction diagram corresponding to the cell section image, the dividing cell prediction diagram describing a probability that pixels of the cell section image belong to a dividing cell; and performing region segmentation on the dividing cell prediction diagram to obtain a dividing cell region in the cell section image.

20. A non-transitory computer-readable storage medium, storing a plurality of computer programs that, when executed by a processor of a computer device, cause the computer device to perform a plurality of operations including:
- obtaining a training sample image set, training sample images in the training sample image set comprising a plurality of target-type objects with marked sample centroids;
- determining a first region and a second region corresponding to each of the target-type objects according to a position of a sample centroid of the target-type object, the first region being a subregion of the second region, the first region and the second region having the same center, the center being the sample centroid of the corresponding target-type object;
- calculating, by using an object detection model, a first relation degree to which pixels of the first region of the target-type object belong to a target region;
- calculating, by using the object detection model, a second relation degree to which pixels beyond the second region of the target-type object belong to a background region;
- calculating a training loss value according to the first relation degree and the second relation degree; and
- adjusting the object detection model according to the training loss value, until a convergence condition is met, to obtain a target object detection model.

* * * * *